US011747152B2

(12) United States Patent
Benericetti et al.

(10) Patent No.: US 11,747,152 B2
(45) Date of Patent: Sep. 5, 2023

(54) SYSTEMS AND METHODS FOR DETERMINING AN OPTIMIZED PATH FOR NAVIGATION BASED ON FEATURES ASSOCIATED WITH POINTS OF INTEREST

(71) Applicant: Verizon Connect Development Limited, Dublin (IE)

(72) Inventors: Andrea Benericetti, Prato (IT); David Leonardo Spain Contini, Florence (IT); Luca Noce, Sassari (IT); Francesca Chiti, Quarrata PT (IT); Andrea Giannoni, Sesto Fiorentino (IT); Francesco Sambo, Florence (IT); S M Murtoza Habib, Milan (IT)

(73) Assignee: Verizon Connect Development Limited, Dublin (IE)

( * ) Notice: Subject to any disclaimer, the term of this patent is extended or adjusted under 35 U.S.C. 154(b) by 0 days.

(21) Appl. No.: 16/947,502

(22) Filed: Aug. 4, 2020

(65) Prior Publication Data

US 2022/0042807 A1    Feb. 10, 2022

(51) Int. Cl.
*G01C 21/34*    (2006.01)
*G01C 21/36*    (2006.01)
*B60W 60/00*    (2020.01)

(52) U.S. Cl.
CPC ......... *G01C 21/343* (2013.01); *B60W 60/001* (2020.02); *G01C 21/3461* (2013.01); *G01C 21/3476* (2013.01); *G01C 21/3605* (2013.01)

(58) Field of Classification Search
CPC .............. G01C 21/343; G01C 21/3461; G01C 21/3476; G01C 21/3605; B60W 60/001
See application file for complete search history.

(56) References Cited

U.S. PATENT DOCUMENTS

| 7,920,965 | B1* | 4/2011 | Nesbitt | .................. G01C 21/00 |
| | | | | 701/416 |
| 2011/0137551 | A1* | 6/2011 | Peri | ..................... G01C 21/3453 |
| | | | | 701/533 |

(Continued)

FOREIGN PATENT DOCUMENTS

CN        106197444 A   * 12/2016

OTHER PUBLICATIONS

Machine Translation of CN106197444A (Year: 2016).*
Roadtrippers, "Plan your next road trip faster." https://roadtrippers.com/, 2013, 6 pages.

*Primary Examiner* — Faris S Almatrahi
*Assistant Examiner* — Sahar Motazedi

(57) ABSTRACT

A trip planning system may receive, from a user device, trip data identifying a starting point and a destination point for a trip and feature data identifying weights for trip features. The trip planning system may determine a geographical region of interest based on the starting point and the destination point. The trip planning system may receive viewpoint data identifying viewpoints located within the geographical region and may calculate, based on the feature data, viewpoint relevance scores for the viewpoints. The trip planning system may determine, based on the viewpoint data and the trip data, paths for the trip and driving times for the paths. The trip planning system may calculate an optimized path, from the paths, based on the viewpoint relevance scores and the driving times associated with the paths. The trip planning system may perform one or more actions based on the optimized path.

20 Claims, 14 Drawing Sheets

(56) References Cited

U.S. PATENT DOCUMENTS

| | | | | |
|---|---|---|---|---|
| 2013/0304372 A1* | 11/2013 | Mellert | ............ | G01C 21/3679 |
| | | | | 701/410 |
| 2015/0066649 A1* | 3/2015 | Kumar | ............... | G01C 21/3476 |
| | | | | 705/14.64 |
| 2017/0176205 A1* | 6/2017 | Jones | ................... | G01C 21/367 |
| 2020/0019175 A1* | 1/2020 | Dean | ................... | G05D 1/0088 |
| 2020/0318982 A1* | 10/2020 | Shirani-Mehr | ........ | G06V 20/56 |

* cited by examiner

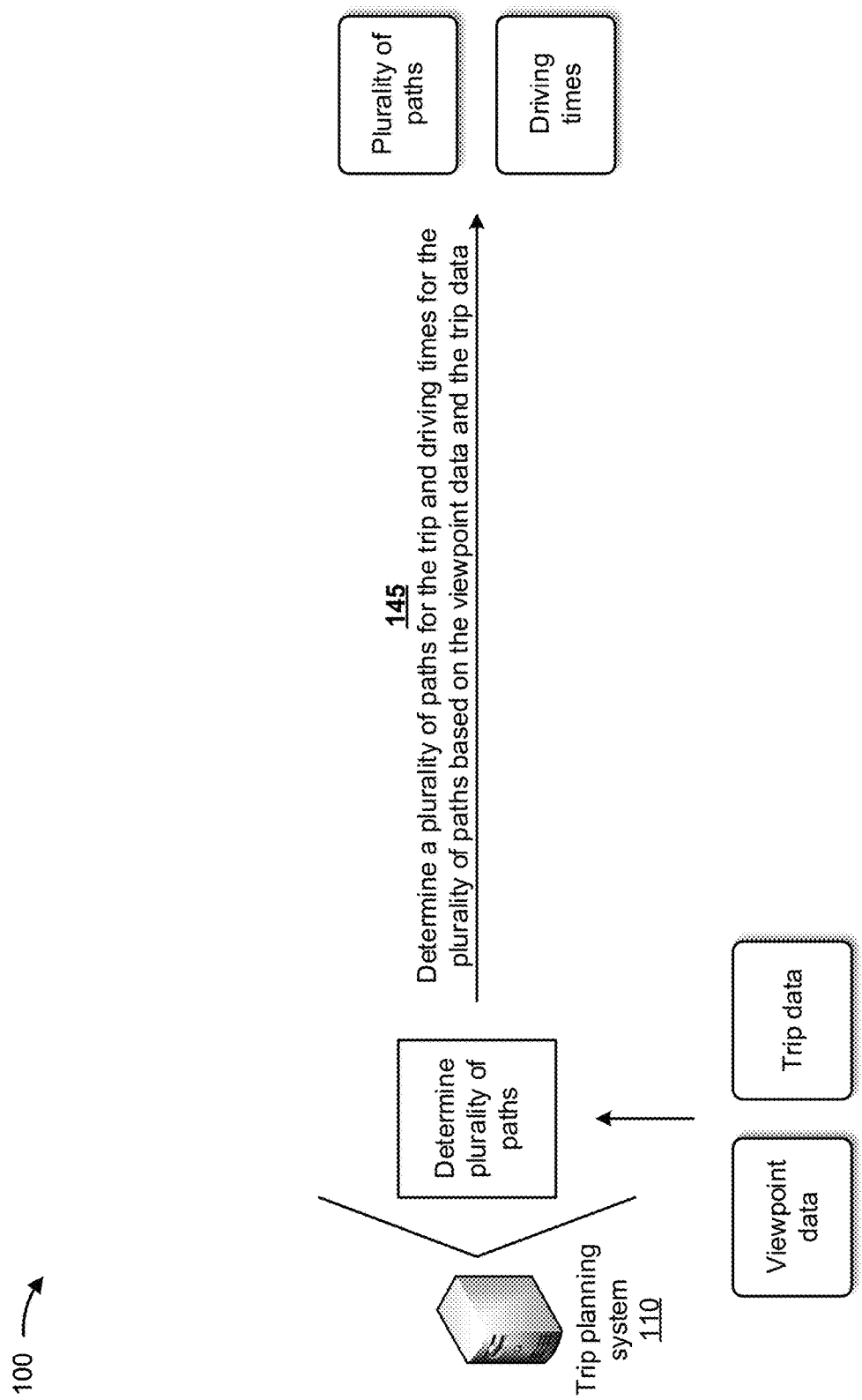

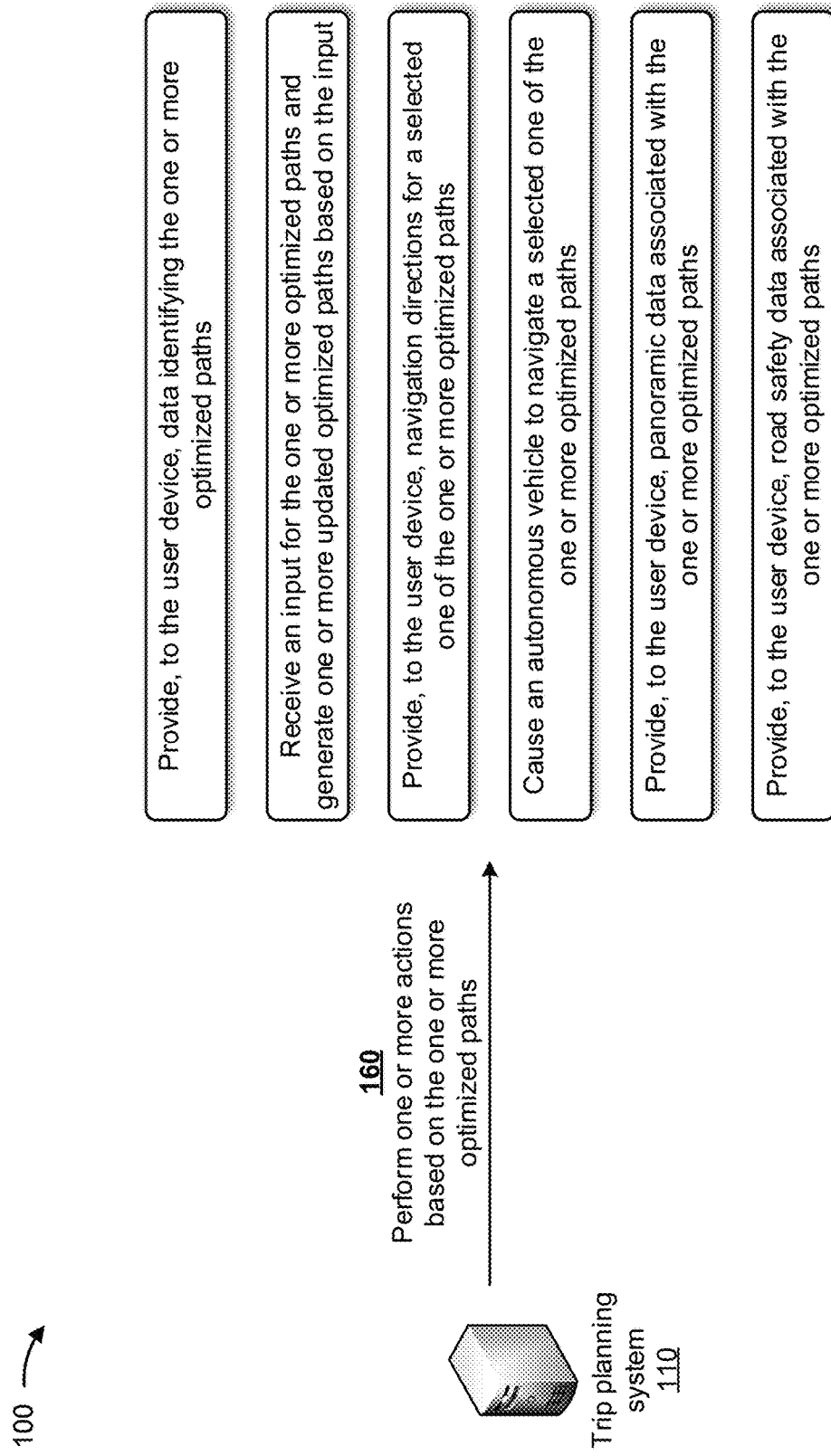

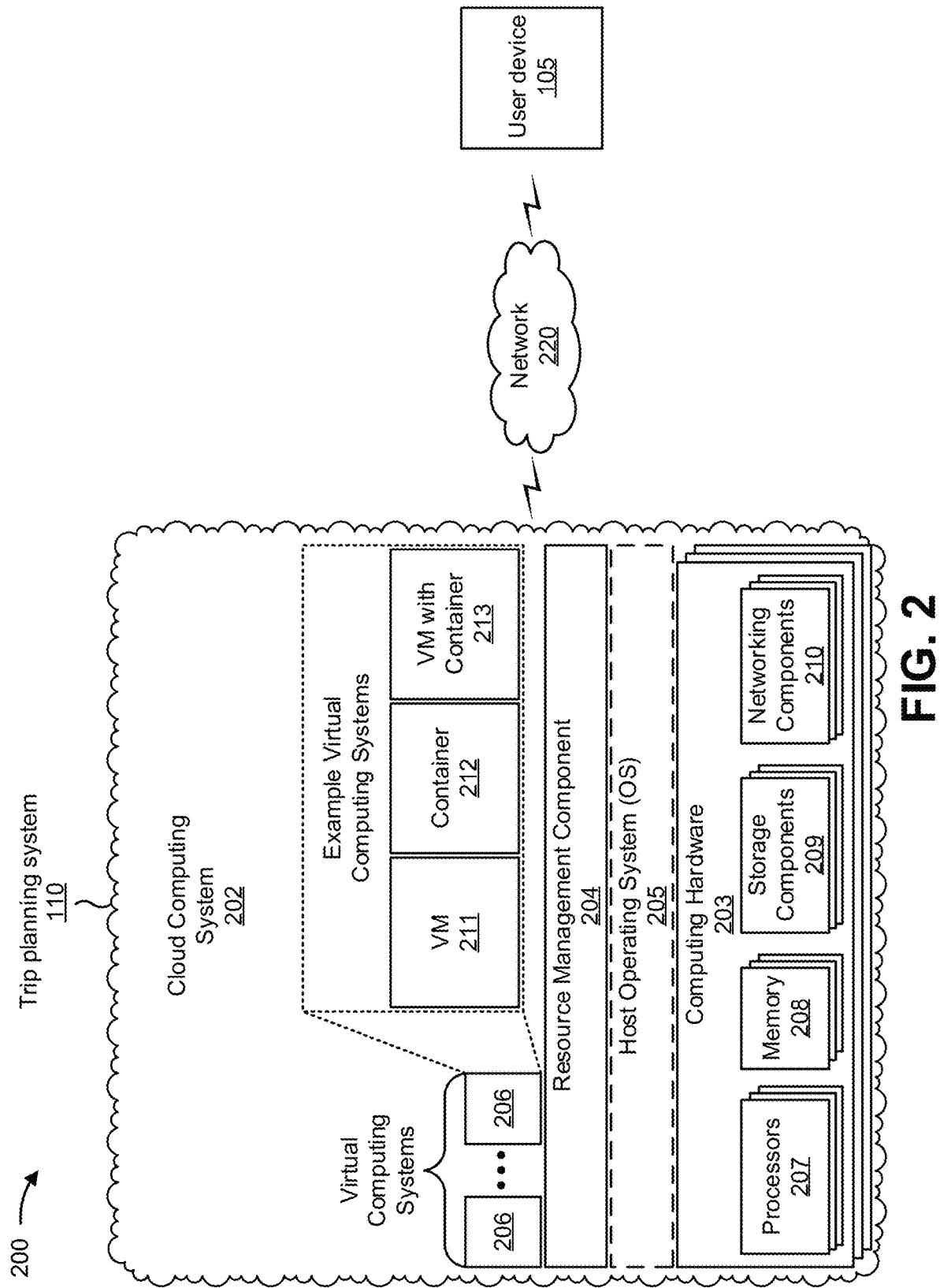

US 11,747,152 B2

SYSTEMS AND METHODS FOR DETERMINING AN OPTIMIZED PATH FOR NAVIGATION BASED ON FEATURES ASSOCIATED WITH POINTS OF INTEREST

BACKGROUND

A vehicle navigation system may enable a user (e.g., a driver of a vehicle) to enter a starting point and a destination point for a trip the user desires to take. The vehicle navigation system may determine a route from the starting point to the destination point, and may provide directions to the user for following the route.

BRIEF DESCRIPTION OF THE DRAWINGS

FIGS. 1A-1K are diagrams of an example implementation described herein.

FIG. 2 is a diagram of an example environment in which systems and/or methods described herein may be implemented.

DETAILED DESCRIPTION OF PREFERRED EMBODIMENTS

Figure 1A:
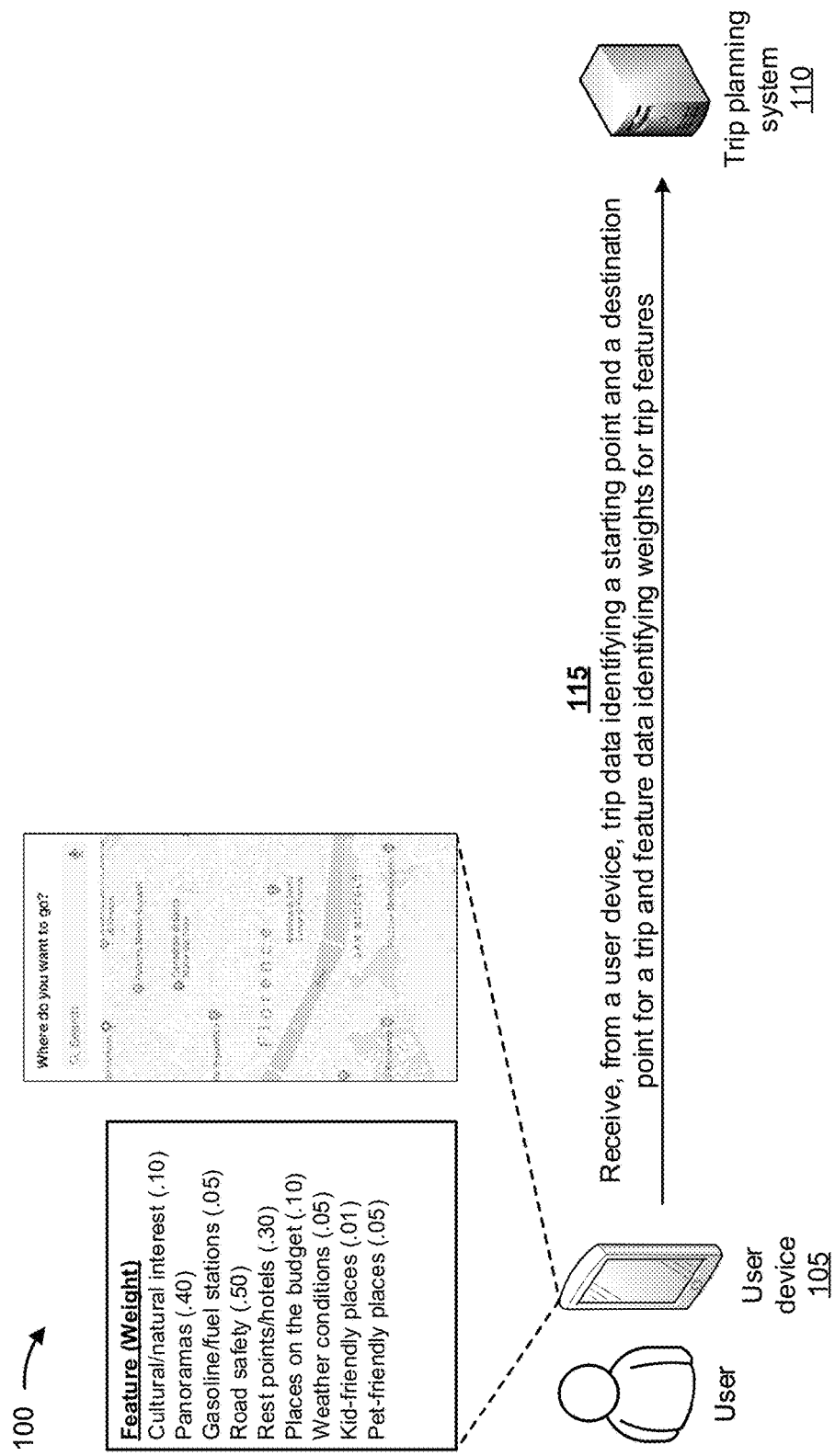

The following detailed description of example implementations refers to the accompanying drawings. The same reference numbers in different drawings may identify the same or similar elements.

When determining a route for a user, a vehicle navigation system may identify points of interest that are proximate to the route. In such a case, however, the points of interest are not customized to the interests or preferences of the particular user for a particular trip. Furthermore, the route determined by the vehicle navigation system is typically based on a shortest travel time, and does not take into account leisure travel (e.g., sight-seeing) objectives. As a result, a route calculated by a current vehicle navigation system may not include points of interest that relate to leisure travel objectives that are of particular interest to a particular user, or may not take into account specific preferences of the particular user. For these reasons, a user with unique travel objectives may be required to rely on sources of information external to the vehicle navigation system to plan a route accordingly. In the case of a user with leisure travel objectives, the user may rely on external information to identify points of interest that are of particular interest to the user. Furthermore, the user may be required to manually determine a route that incorporates the desired points of interest and, if the vehicle navigation system is used, to input location information for all locations of the desired points of interest for the vehicle navigation system to determine sub-routes to and/or from each of the locations. This wastes computing resources (e.g., processing resources, memory resources, communication resources, and/or the like) associated with researching information, inputting additional information into the vehicle navigation system, and/or the like.

Some implementations described herein provide a trip planning system that determines an optimized path for navigation, based on features associated with points of interest, that is customized to the interests or preferences of a particular user for a particular trip. For example, the trip planning system may receive, from a user device, trip data identifying a starting point and a destination point for a trip and feature data identifying weights for trip features. The trip planning system may determine a geographical region of interest based on the starting point and the destination point of the trip data, may receive viewpoint data identifying viewpoints located within the geographical region, and may calculate, based on the feature data, viewpoint relevance scores for the viewpoints of the viewpoint data. The trip planning system may determine, based on the viewpoint data and the trip data, a plurality of paths for the trip and driving times for the plurality of paths. The trip planning system may calculate an optimized path, from the plurality of paths, based on the viewpoint relevance scores and the driving times associated with the plurality of paths, and may perform one or more actions based on the optimized path.

In this way, the trip planning system provides an interface for customized trips based on preferences of a particular user. The trip planning system may save the particular user from having to rely on sources of information external to a vehicle navigation system to identify points of interest that are of particular interest to the user. Additionally, the trip planning system prevents the user from having to manually determine paths that incorporate the points of interest, and/or from having to input location information for the points of interest in order for the vehicle navigation system to determine sub-routes to and/or from each of the locations. This conserves computing resources (e.g., processing resources, memory resources, communication resources, and/or the like) that would otherwise be required to research information, input additional information into the vehicle navigation system, and/or the like.

FIGS. 1A-1K are diagrams of an example 100 associated with determining an optimized path for navigation based on features associated with points of interest. As shown in FIGS. 1A-1K, example 100 includes a user device 105 of a user, and a trip planning system 110. The user may be a driver, a passenger, and/or the like of a vehicle. The user device 105 may be a mobile phone (e.g., a smart phone), a computer, a wearable communication device, a navigation device (e.g., a portable or vehicle-installed navigation device), or a similar type of device. As described herein, the trip planning system 110 may be a server system (e.g., a cloud computing system) that interacts with an application on user device 105 to determine an optimized path for navigation for the user of user device 105. Trip planning system 110 may be associated with, may include, or may be included in a vehicle navigation system that provides navigation directions (e.g., via user device 105 or a different user device). The user may cause the vehicle to follow the optimized path in accordance with information provided by trip planning system 110.

As shown in FIG. 1A, and by reference number 115, trip planning system 110 may receive, from user device 105, trip data identifying a starting point and a destination point for a trip and feature data identifying weights for trip features. For example, trip planning system 110 may provide, to user device 105, a user interface that enables input of the trip data and of preference data (e.g., by the user). Trip planning system 110 may receive the trip data and the preference data based on input by the user via the user interface. In some implementations, the preference data may include the feature data (e.g., preferences for different trip features, data identifying weights for the different trip features, information that trip planning system 110 may use to identify the weights for the different trip features, and/or the like).

Additionally, or alternatively, the preference data may include information, provided by the user, that indicates a degree of emphasis to be placed on different factors (e.g., travel time, number of viewpoints, and/or the like) in determining an optimized path for a trip. In some implementations, the user may provide the destination point and the starting point. Additionally, or alternatively, the user may provide the destination point, and the starting point may be provided automatically by user device 105, trip planning system 110, an associated vehicle navigation system, and/or the like based on determining a position (e.g., using a global positioning system (GPS) or other satellite navigation system) of user device 105, a vehicle associated with the user, and/or the like.

The trip features may relate to aspects of a trip that may potentially be of interest or importance to a user, and thus may be factors in planning and/or embarking on a trip. For example, the trip features may include types or categories of such aspects, such as cultural points of interest, natural points of interest, panoramic points of interest, fuel station availability, road safety, rest point availability, hotel availability, kid-friendly points of interest, pet-friendly points of interest, and/or other types of attractions, services, and/or the like. The feature data may include weights for the trip features, such as may be entered by the user via the user interface of user device 105. The weights may represent a level of interest of the user in each feature. For example, as shown, the user may indicate a higher interest in road safety (0.50), panoramas (0.40), and rest points/hotels (0.30), a lower interest in cultural/natural points of interest (0.10), places on the budget (0.10), gasoline/fuel stations (0.05), weather conditions (0.05), and pet-friendly places (0.05), and a very low interest in kid-friendly places (0.01).

Trip planning system 110 may use the weights to determine one or more paths for the trip based on relevance of points of interest in the paths to the user, as will be described herein. In some implementations, the user may provide the weights by indicating or selecting numbers within a range, by selecting degrees of emphasis from a list, by moving a slider on a slider bar, and/or the like. Additionally, or alternatively, trip planning system 110 may set the weights based on weights that the user has previously provided (e.g., for previous trips), based on other information maintained about the user (e.g., hobbies and interests), and/or the like. In some implementations, the user may provide the weights by providing preference information that trip planning system 110 may utilize to determine the weights. In some implementations, the user may indicate additional information that may be used by trip planning system 110 to plan a trip, such as trip features that are required to be present and/or determined to satisfy a threshold level of relevance, trip features that are required to be excluded, and/or the like.

Figure 1B:
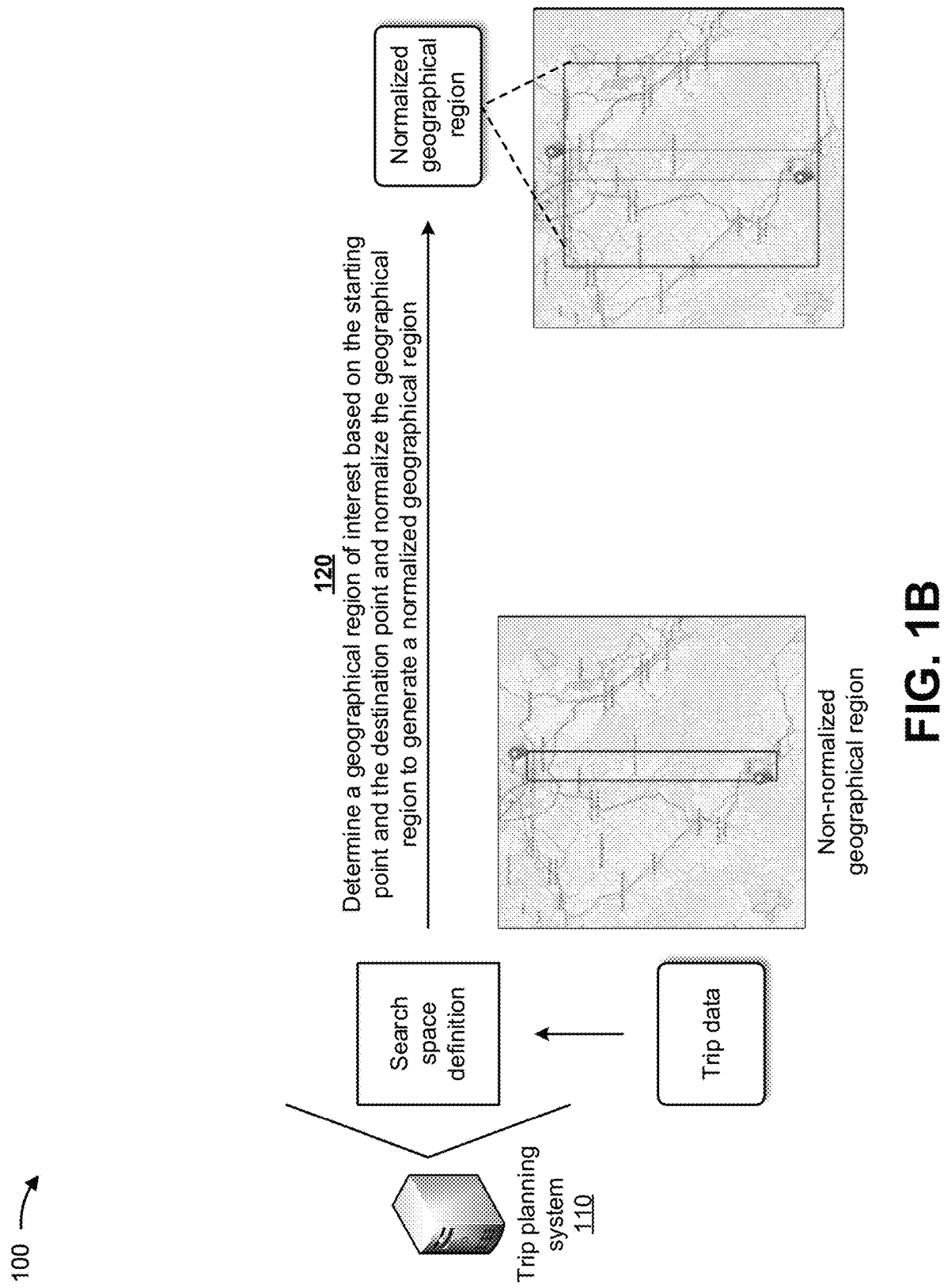

As shown in FIG. 1B, and by reference number 120, trip planning system 110 may determine a geographical region of interest based on the starting point and the destination point, and may normalize the geographical region to generate a normalized geographical region. For example, trip planning system 110 may normalize an initial geographical region to generate a normalized geographical region that is geographically larger than the initial geographical region. In some implementations, the initial (non-normalized) geographical region is a rectangular box bounded by the starting point and the destination point as opposite corners, as shown. In this case, if the rectangular box is narrow (e.g., has an aspect ratio greater than 5:3), trip planning system 110 may extend the shorter sides of the box to generate a rectangular box that is less narrow (e.g., has an aspect ratio that is no greater than 5:3), as shown. Additionally, before or after normalizing the geographical region, trip planning system 110 may extend the longer sides of the box by a predetermined amount (e.g., 10% on each end, 20% at the destination end, and/or the like) beyond the starting point and/or destination point. In this way, trip planning system 110 enables the identification of a greater number of locations of interest that may be included in the user's route of travel.

In some implementations, trip planning system 110 may determine and/or normalize the geographical region in other ways, based on other shapes, and/or the like. In this case, trip planning system 110 may normalize the initial geographical region by modifying a feature (e.g., a side, a width, a length, a radius, an axis, and/or the like) of the initial geographical region to generate a geographical region that includes a same characteristic (e.g., a same starting point, a same destination point, a same side, a same length, a same width, a same center, a same vertex, and/or the like) as the initial geographical region. For example, trip planning system 110 may generate an ellipse (e.g., using the starting point and the destination point as initial focal points of the ellipse) as the geographical region, may broaden the ellipse based on a major axis to minor axis ratio to normalize the geographical region, and/or the like. Additionally, or alternatively, trip planning system 110 may enable a user to specify the geographical region (e.g., by using a user interface of user device 105 to draw, on a displayed map, a bounding perimeter within which viewpoints are to be contained).

Figure 1C:
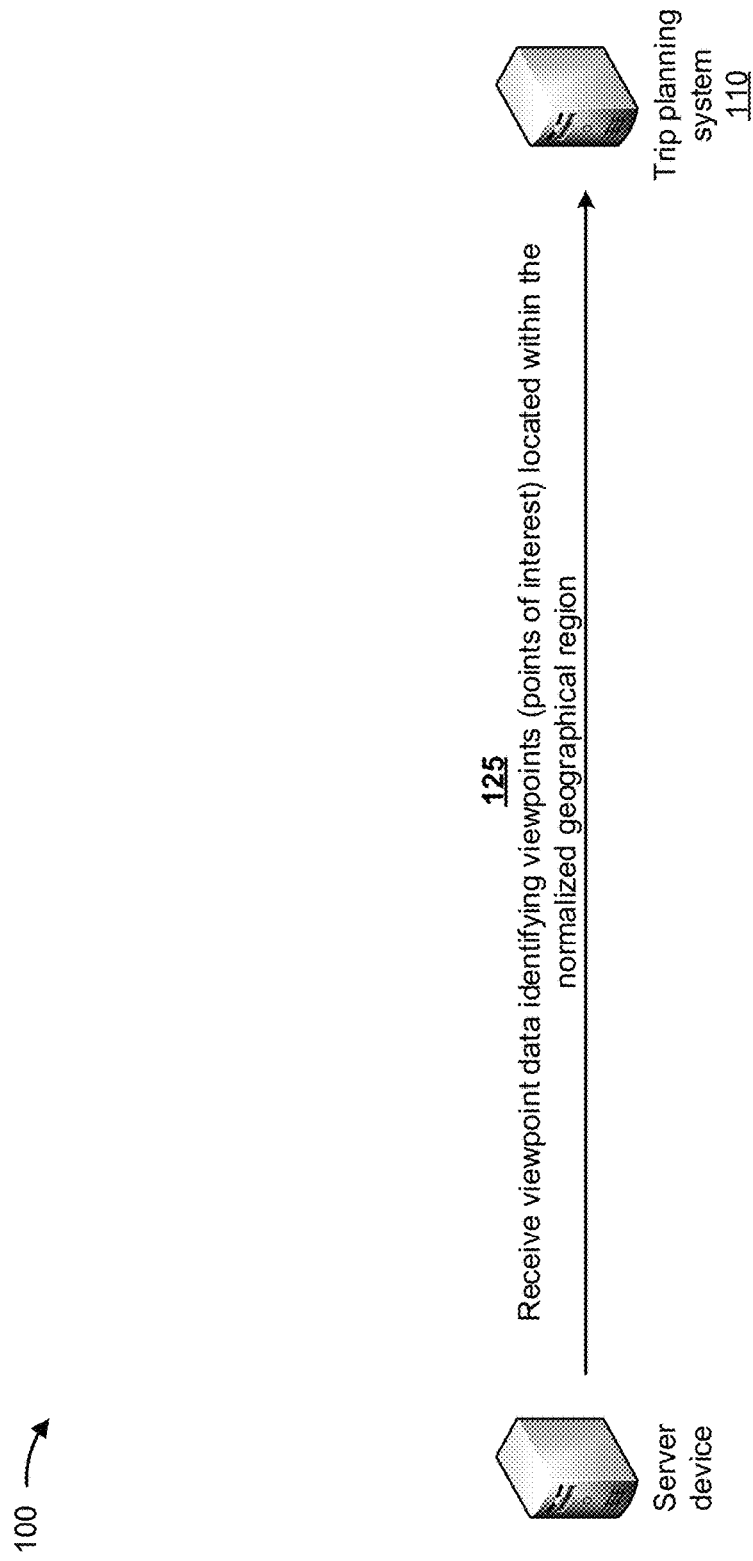

As shown in FIG. 1C, and by reference number 125, trip planning system 110 may receive viewpoint data identifying viewpoints located within the normalized geographical region. For example, viewpoints may include specific points of interest that may appeal to the leisure objectives of a traveler (e.g., a particular panoramic view, a particular cultural point of interest, and/or the like). To obtain the viewpoint data, trip planning system 110 may provide information defining the normalized geographical region (e.g., GPS coordinates of boundaries of the geographical region) to a third party provider (e.g., OpenStreetMap, MapBox, and/or the like) and may receive, from the third party provider, viewpoint data associated with viewpoints within the normalized geographical region. In some implementations, trip planning system 110 may provide criteria (e.g., keywords, categories, and/or the like) to the third-party provider. In this case, the third-party provider may identify points of interest within the normalized geographical region, and may determine the viewpoints to include only particular points of interest, of the identified points of interest, that satisfy the criteria. In this way, trip planning system 110 may identify viewpoints that relate to leisure objectives (e.g., that have cultural or natural interest, that are associated with panoramas, and/or the like).

In some implementations, if the viewpoint data identifies less than a designated minimum threshold number of viewpoints, trip planning system 110 may provide information to the third-party planner to obtain viewpoint data associated with additional viewpoints. Additionally, or alternatively, if the viewpoint data identifies more than a designated maximum threshold number of viewpoints, trip planning system 110 may reduce the viewpoints based on information obtained from the third party provider (e.g., ratings, categories, descriptions, and/or the like), based on requesting that the third party provider reduce the number of viewpoints, and/or the like. For example, if a large number of viewpoints of a particular type (e.g., cultural points of interest) are identified, trip planning system 110 and/or the third party provider may eliminate viewpoints associated with ratings (e.g., TripAdvisor ratings, and/or the like) that do not satisfy a designated threshold rating or percentage (e.g., top 50%). In some implementations, trip planning system 110 may maintain user information about the user (e.g., interests, hobbies, and/or the like) and may utilize the information and/or provide the information to the third party provider to reduce the number of viewpoints based on identifying viewpoints that correspond to the user information. In this case, trip planning system 110 may maintain and/or communicate the user information securely (e.g., using encryption and other data security measures), and may only utilize the user information if the user has opted in to permit such use of the user information.

In some implementations, if the viewpoint data identifies less than a designated minimum threshold number of viewpoints, trip planning system 110 may enlarge the normalized geographical region and may provide updated information to reflect the larger normalized geographical region to the third-party provider in order to identify a greater number of viewpoints. Additionally, or alternatively, if the viewpoint data identifies more than a designated maximum threshold number of viewpoints, trip planning system 110 may reduce the normalized geographical region and may provide updated information to reflect the smaller normalized geographical region to the third-party provider in order to identify a smaller number of viewpoints.

In some implementations, the user may designate the minimum threshold number of viewpoints and/or the maximum number of viewpoints, trip planning system 110 may set the minimum threshold number of viewpoints and/or the maximum threshold number of viewpoints based on information associated with the user and/or the trip, and/or the like. In some implementations, trip planning system 110 may combine two or more viewpoints (e.g., proximate viewpoints, proximate viewpoints associated with similar characteristics, and/or the like) into a single viewpoint.

Figure 1D:
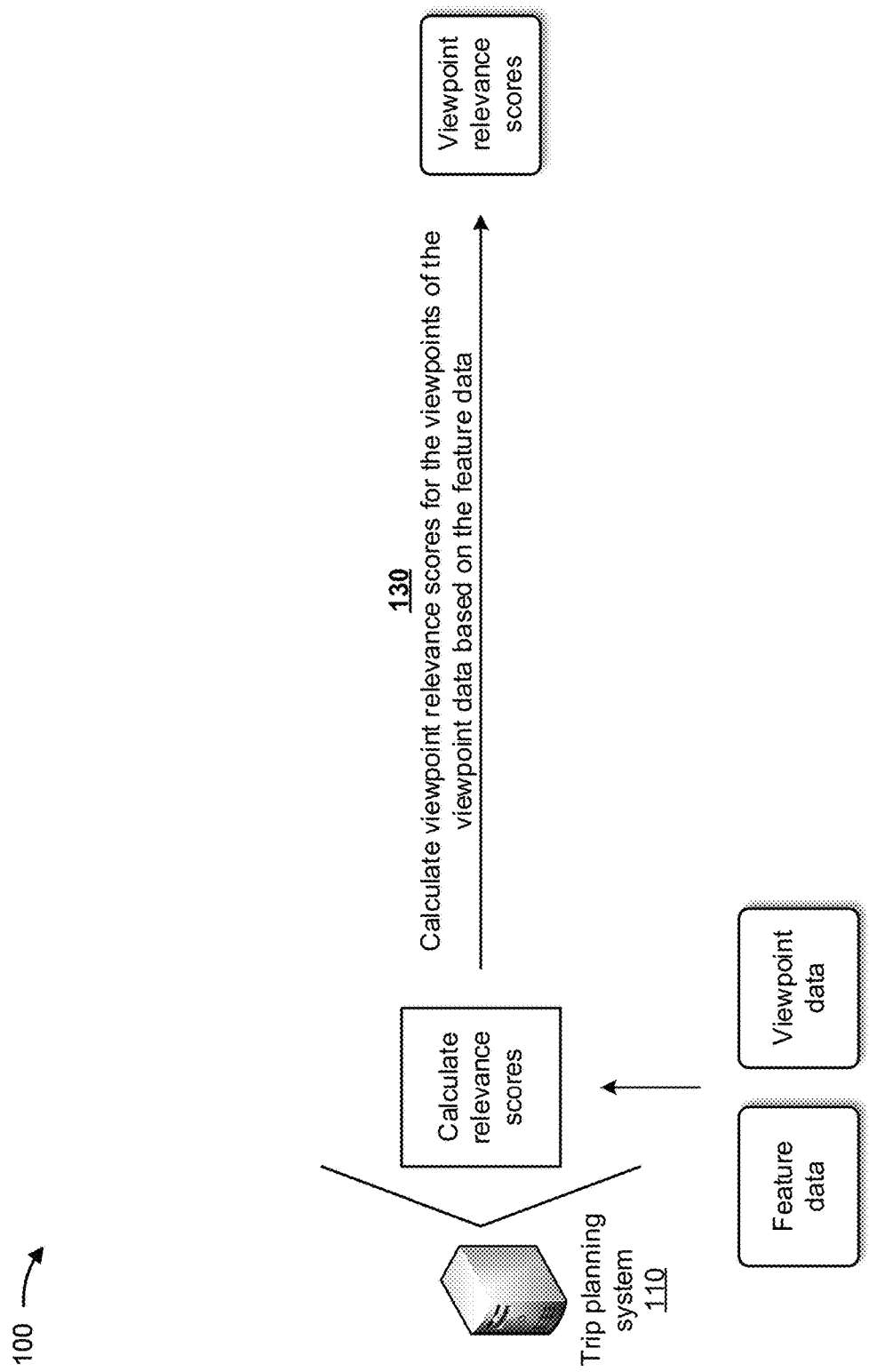

As shown in FIG. 1D, and by reference number 130, trip planning system 110 may calculate viewpoint relevance scores for the viewpoints of the viewpoint data based on the feature data. For example, trip planning system 110 may calculate a viewpoint relevance score for each viewpoint of the viewpoints. When calculating the viewpoint relevance score for a viewpoint, trip planning system 110 may consider each of the trip features with respect to the viewpoint. For example, trip planning system 110 may calculate the viewpoint relevance score based on a plurality of feature-specific viewpoint relevance scores, each of which corresponds to a relevance of the viewpoint to one of the trip features. In this case, trip planning system 110 may calculate the feature-specific viewpoint relevance score for each trip feature (e.g., based on the weight identified for the trip feature) to generate a plurality of feature-specific viewpoint relevance scores, and may calculate the viewpoint relevance score based on the plurality of feature-specific viewpoint relevance scores.

In some implementations, trip planning system 110 may calculate a feature-specific viewpoint relevance score for each trip feature as a function of the weight identified for the trip feature (e.g., provided by the user and/or determined by trip planning system 110 based on preference data provided by the user) and an objective relevance score for the viewpoint with respect to the trip feature. In this case, trip planning system 110 may calculate the viewpoint relevance score as a weighted average based on the plurality of feature-specific viewpoint relevance scores. For example, trip planning system 110 may calculate the viewpoint relevance score $VRS_v$ as:

$$VRS_v = \frac{\sum_{f=1}^{n} (\alpha_f \times ORS_{v,f})}{\sum_{f=1}^{n} \alpha_f}$$

where $VRS_v$ is the viewpoint relevance score for viewpoint v, f is each trip feature of n trip features, $\alpha_f$ is the weight for each trip feature f, $ORS_{v,f}$ is the objective relevance score for each trip feature f with respect to viewpoint v, and $\alpha_f \times ORS_{v,f}$ is the feature-specific viewpoint relevance score for each trip feature f with respect to viewpoint v.

Unlike the weight applied to each trip feature, the objective relevance score for each trip feature may be obtained and/or determined in a manner that is independent of characteristics or input of the particular user. Trip planning system 110 may calculate the objective relevance score differently for different trip features. For example, trip planning system 110 may calculate an objective relevance score for panoramas based on a number of pictures that are associated with the viewpoint, as described below with respect to FIG. 1E. As another example, trip planning system 110 may calculate an objective relevance score for road safety based on a number of harsh driving events that have occurred in the vicinity of the viewpoint, as described below with respect to FIG. 1F. In some implementations, trip planning system 110 may calculate an objective relevance score based on information collected (e.g., crowdsourced) from other users.

As will be described in greater detail below, trip planning system 110 may determine a plurality of paths based on different possible combinations of the viewpoints, and may determine optimized paths based on relevance and driving times associated with each of the paths. For use in this determination, trip planning system 110 may calculate a path relevance score for a path. For example, trip planning system 110 may calculate the path relevance score $PRS_{path}$ as an average of the viewpoint relevance scores for all viewpoints in the path:

$$PRS_{path} = \frac{\sum_{v=1}^{n} VRS_v}{n}$$

where $VRS_v$ is the viewpoint relevance score for each viewpoint v, and n is the number of viewpoints.

Additionally, or alternatively, rather than calculating the path relevance score by determining a viewpoint relevance score for each viewpoint (based on all relevant trip features) and aggregating the viewpoint relevance scores for all viewpoints in the path, as described above, trip planning system 110 may calculate the path relevance score by determining a feature relevance score for each trip feature (based on all viewpoints in the path) and aggregating the feature relevance scores for all trip features. In this case, for example, a feature-based relevance score may be an objective relevance score for an entire path (e.g., calculated with respect to all viewpoints in the path) rather than a single viewpoint, and the path relevance score may be calculated as a weighted average of feature relevance scores, applying the weights for each trip feature.

In some implementations, the path relevance score, the viewpoint relevance scores, the objective relevance scores, and/or the like, may be calculated such that greater relevance is associated with a higher value. For example, trip planning system 110 may calculate the path relevance score, the viewpoint relevance scores, the objective relevance scores, and/or the like to be bounded between 0 and 1, where 0 indicates the lowest possible relevance and 1 indicates the highest possible relevance. Alternatively, the path relevance score, the viewpoint relevance scores, the objective relevance scores, and/or the like, may be calculated as inverse functions (e.g., such that greater relevance is associated with a lower value). For example, trip planning system 110 may calculate the path relevance score, the viewpoint relevance scores, the objective relevance scores, and/or the like to be bounded between 0 and 1, where 0 indicates the highest possible relevance and 1 indicates the lowest possible relevance.

Figure 1E:
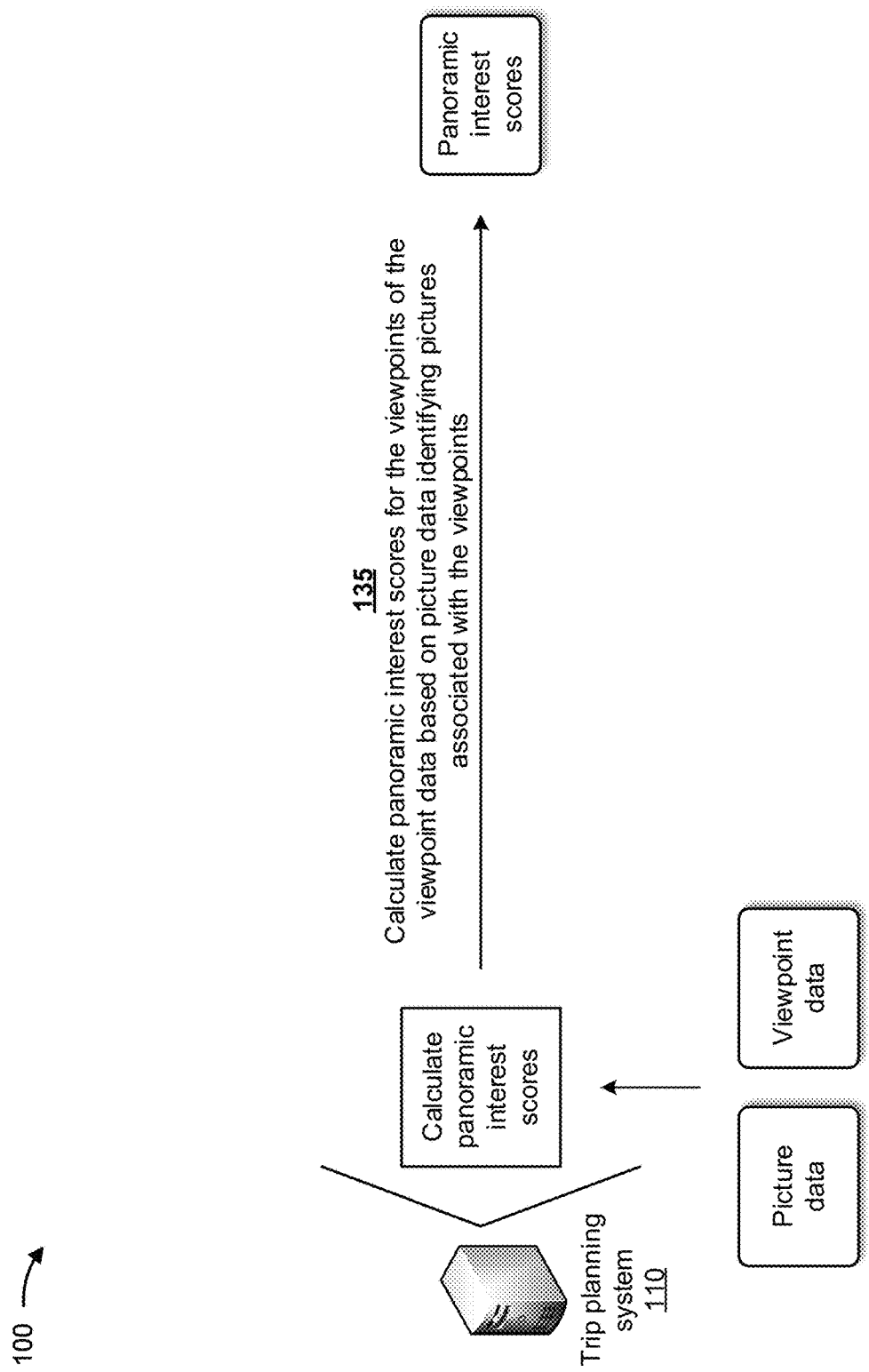

As shown in FIG. 1E, and by reference number 135, trip planning system 110 may calculate panoramic interest scores (e.g., corresponding to the trip feature for panoramas) for the viewpoints of the viewpoint data based on picture data identifying pictures associated with the viewpoints. The panoramic interest score for a viewpoint may be an objective relevance score (e.g., as described above) for the trip feature for panoramas associated with the viewpoint. A panorama may include a scenic view (e.g., of natural scenery, an iconic structure, a landscape, or the like).

In some implementations, trip planning system 110 may calculate the panoramic interest score for a viewpoint based on a number of pictures that are associated with the viewpoint. For example, the pictures may be digital photographs associated with a third-party provider such as an image hosting service (e.g., Flickr). In this case, trip planning system 110 may obtain, from the third-party provider, information identifying pictures, previously uploaded by users, that may be relevant to the viewpoint. For example, trip planning system 110 may provide information such as a location of the viewpoint, criteria for photographs to be included (e.g., keywords, categories, filters, and/or the like), and/or the like, and the third party provider may utilize the information to identify the pictures (e.g., based on geolocation information associated with the pictures, tags or keywords associated with the pictures, categories associated with the pictures, and/or the like). In some implementations, trip planning system 110 may obtain a count of the pictures from the third-party provider. Additionally, or alternatively, trip planning system 110 may obtain image files associated with the pictures, and may use the image files at a later point to display the pictures to the user (e.g., when a corresponding viewpoint is proximate, is selected by the user, and/or the like). In some implementations, the picture data may include information associated with the pictures (e.g., ratings, descriptions, categories, and/or the like) and trip planning system 110 may cause user device 105 to display the information, and/or use the information to determine what pictures or information to display, when referencing viewpoints to which the information corresponds, when displaying pictures to which the information corresponds, and/or the like, as described herein.

Upon identifying the pictures, trip planning system 110 may calculate the panoramic interest score for a viewpoint based on the number of pictures identified. For example, trip planning system 110 may calculate the panoramic interest score for a viewpoint based on a decreasing function such as a logarithm (e.g., a base 2 logarithm) of the number of pictures assigned to the viewpoint. In this way, trip planning system 110 may model a relationship between the number of pictures and an expected level of interest in the viewpoint.

In some implementations, trip planning system 110 may calculate the panoramic interest score based on additional information, such as ratings associated with the pictures, metadata associated with the pictures that may indicate particular relevance or value, and/or the like. For example, trip planning system 110 may identify pictures that have been taken as panoramic images (e.g., based on data indicating camera settings, dimensions of the picture, and/or the like), and may increase the panoramic interest score based on an existence and/or quantity of the panoramic images. In some implementations, trip planning system 110 may identify distinct differences in the characteristics (e.g., subject, location, angle, and/or the like) of pictures identified for a viewpoint, may separate the pictures into sets based on the different characteristics, may calculate scores for each set (e.g., may apply a decreasing function, as described above, to each set), and may aggregate the scores for all sets to produce the panoramic interest score.

In some implementations, such as in an implementation that calculates an objective relevance score for an entire path as described above, trip planning system 110 may calculate the panoramic interest score for all viewpoints in the path. In this case, trip planning system 110 may calculate the panoramic interest score for all pictures associated with all viewpoints on the path (e.g., may apply a decreasing function, as described above, to a total number of pictures identified for all viewpoints in the path). In some implementations, prior to calculating a panoramic interest score for a particular viewpoint, trip planning system 110 may obtain picture data associated with all viewpoints in an entire region (e.g., a normalized geographical region, as described above, a region associated with an entire path, and/or the like). In this case, trip planning system 110 may assign each picture to a closest viewpoint, to a viewpoint within a threshold distance of a location of the picture, and/or the like. Thereafter, trip planning system 110 may calculate the panoramic interest score for a viewpoint based on the number of pictures assigned to the viewpoint and/or other factors, in a manner similar to what is described above.

Figure 1F:
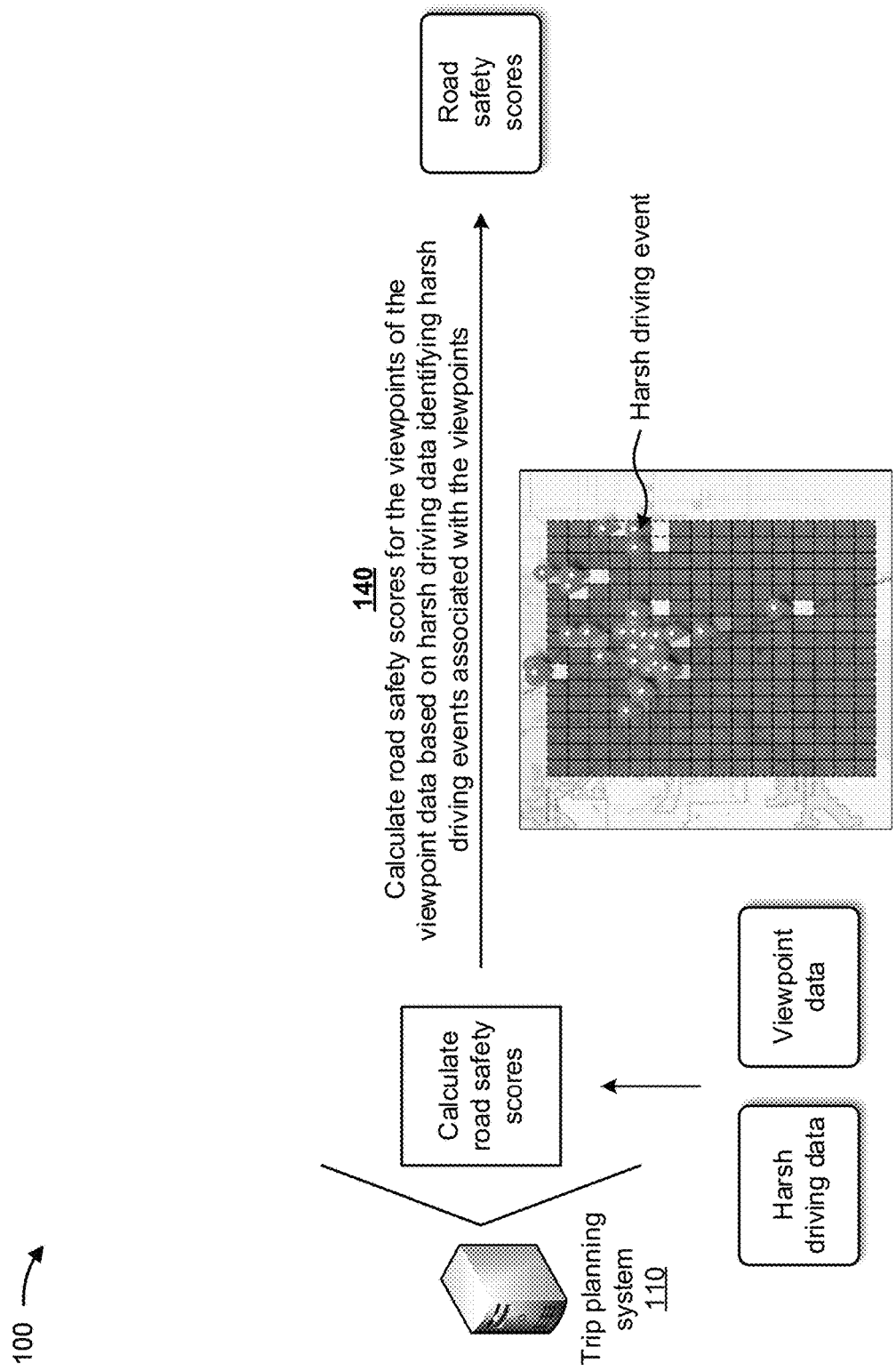

As shown in FIG. 1F, and by reference number 140, trip planning system 110 may calculate road safety scores (e.g., corresponding to the trip feature for road safety) for the viewpoints of the viewpoint data based on harsh driving data identifying harsh driving events associated with the viewpoints. The road safety score for a viewpoint may be an objective relevance score (e.g., as described above) for a trip feature for road safety associated with the viewpoint. Road safety may relate to road hazards, locations vulnerable to weather conditions, inherently dangerous roads, and/or the like.

In some implementations, trip planning system 110 may calculate a road safety score for a viewpoint based on a number of harsh driving events that have occurred in the vicinity of the viewpoint. For example, trip planning system 110 may obtain information associated with the harsh driving events from a database of historical vehicle tracking unit (VTU) data that has been collected from vehicles traveling in the vicinity of the viewpoint. The VTU data may include activity and status information that trip planning system 110 may use to identify and/or determine that harsh driving events have occurred in the vicinity of a viewpoint. For example, the harsh driving events may include harsh braking, hard cornering, over-speeding, and/or the like.

In some implementations, trip planning system 110 may calculate the road safety score based on a ratio of a number of harsh driving events to a number of general driving events collected from the vicinity of the viewpoint. The general driving events may include additional kinds of driving events (e.g., normal braking, normal cornering, moderate speed, and/or the like) as well as the harsh driving events. In some implementations, trip planning system 110 may calculate the road safety score based harsh driving data associated with harsh driving events that have occurred within a particular time period, such as a last n hours (e.g., 2 hours, 24 hours, and/or the like), a same time period from different days, and/or the like.

In some implementations, prior to calculating a road safety score for a particular viewpoint, trip planning system 110 may obtain harsh driving data associated with all viewpoints in an entire region (e.g., a normalized geographical region, as described above). In some implementations, trip planning system 110 may divide the region into sub-regions, and may associate one or more viewpoints with one or more sub-regions. In this case, trip planning system 110 may identify harsh driving events associated with a viewpoint based on harsh driving data associated with a sub-region, adjacent subregions, subregions within a threshold distance, and/or the like. In some implementations, trip planning system 110 may calculate the road safety score based on primary roadways between the viewpoint and other viewpoints. In an implementation that calculates the road safety score for an entire path, trip planning system 110 may calculate the road safety score for all viewpoints in the path. In this case, trip planning system 110 may calculate the road safety score based on all regions along the path (e.g., including portions of the path between viewpoints).

As shown in FIG. 1G, and by reference number 145, trip planning system 110 may determine a plurality of paths for the trip and driving times for the plurality of paths based on the viewpoint data and the trip data. Trip planning system 110 may determine the plurality of paths based on the starting point and the destination point of the trip, and different combinations of the viewpoints (e.g., including different quantities of viewpoints, different sequences of the viewpoints, and/or the like). For example, for a region that includes a starting point S and a destination point D, and is associated with 5 viewpoints $V_1$, $V_2$, $V_3$, $V_4$, and $V_5$, one path may be S-$V_2$-$V_4$-D, another path may be S-$V_5$-$V_1$-$V_3$-$V_2$-D, and/or the like.

In some implementations, the plurality of paths may include all potential paths that can be defined (e.g., all potential combinations of viewpoints). Alternatively, the plurality of paths may include a smaller set of paths. For example, trip planning system 110 may eliminate paths having driving times that exceed a threshold length of time (e.g., a highest 30% of driving times). In some implementations, trip planning system 110 may eliminate paths that include less than a minimum number of viewpoints, paths that do not satisfy a minimum path relevance score, paths that include viewpoints that do not satisfy a minimum viewpoint relevance score, and/or the like. In some implementations, trip planning system 110 may use an optimization algorithm to select a smaller number of paths. For example, trip planning system 110 may utilize a multi-start local search algorithm to randomly select combinations of viewpoints as candidate paths and then alter the candidate paths, as described below with respect to FIG. 1H. In this way, trip planning system 110 may reduce a number of calculations to determine optimized paths, as will be described with respect to FIG. 1H.

In some implementations, trip planning system 110 determines a driving time for a path, of the plurality of paths, based on determining driving times for each connection in the path (e.g., a driving from S to $V_2$, a driving time from $V_2$ to $V_4$, and a driving time from $V_4$ to D in the first example above), and adding the driving times for all connections in the path to determine the total driving time for the path. Alternatively, trip planning system 110 may not determine driving times prior to identifying specific paths to be used in calculating optimized paths, as will be described with respect to FIG. 1H. In this case, for example, trip planning system 110 may determine driving times for each path for which a path score is calculated (e.g., for each candidate path considered in the multi-start local search algorithm, as described below with respect to FIG. 1H.

Figure 1H:
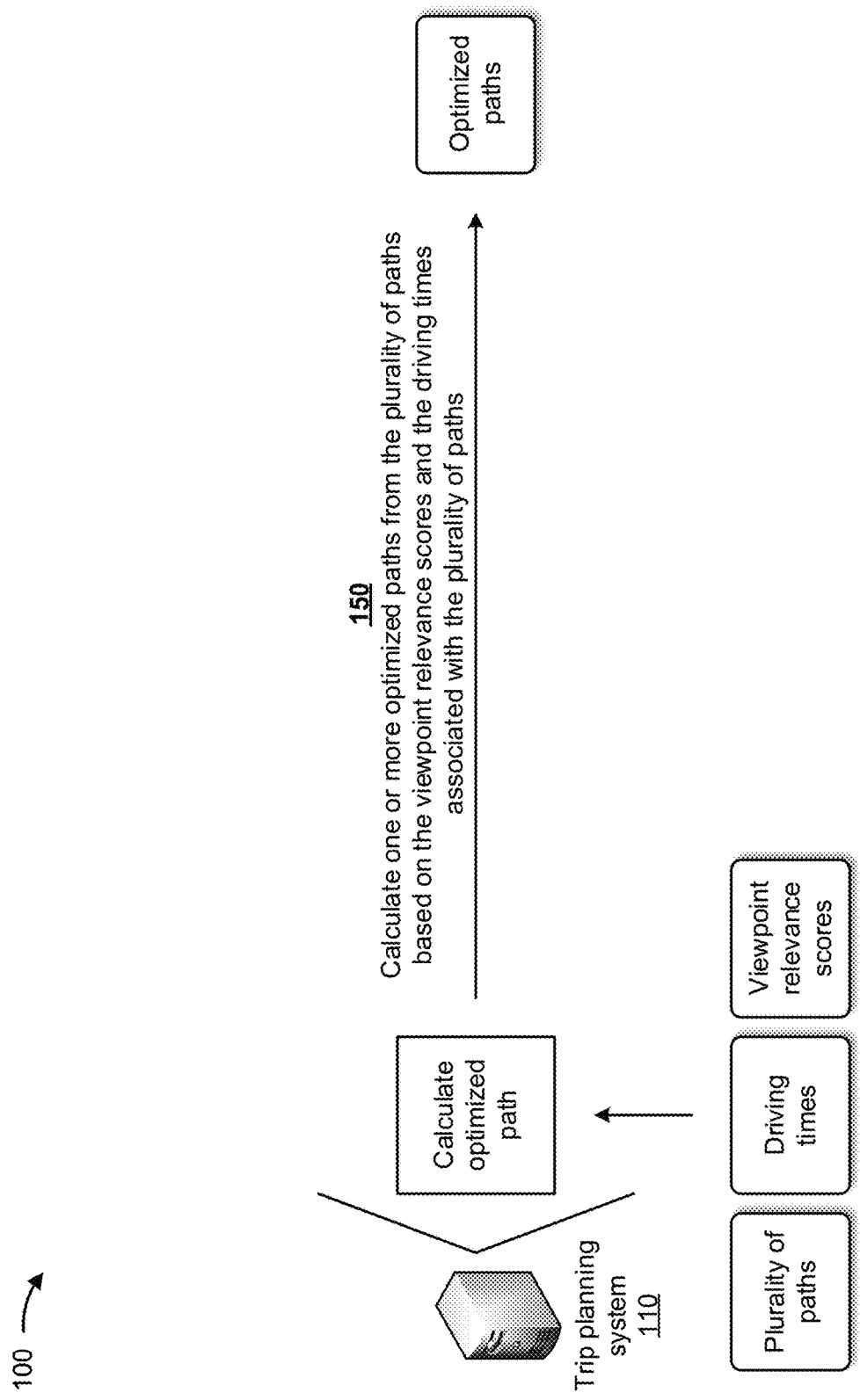

As shown in FIG. 1H, and by reference number 150, trip planning system 110 may calculate one or more optimized paths from the plurality of paths based on the viewpoint relevance scores and the driving times associated with the plurality of paths. For example, trip planning system 110 may calculate the one or more optimized paths by calculating path scores for each path of the plurality of paths, and selecting paths with the best path scores as optimal paths. Trip planning system 110 may calculate the path score of a path as a function of both the path relevance score of the path and the driving time of the path. As described above with respect to FIG. 1D, trip planning system 110 may calculate the path relevance score for a path by determining a viewpoint relevance score for each viewpoint and aggregating the viewpoint relevance scores, by determining a feature relevance score for each trip and aggregating the feature relevance scores, and/or the like.

In some implementations, trip planning system 110 calculates the path score of a path utilizing a tradeoff parameter. The tradeoff parameter may weight an influence of the path relevance score on the path score relative to the influence of the driving time on the path score. In some implementations, the tradeoff parameter may be adjustable (e.g., based on input from the user) based on a desired emphasis on relevance of the path compared to driving time of the path. For example, trip planning system 110 may calculate the path score PathScore$_{path}$ as:

$$\text{PathScore}_{path} = \beta \times \text{PRS}_{path} + (1-\beta) \times \text{TimeScore}_{path}$$

where PathScore$_{path}$ represents an expected overall desirability (by the user) of the path, based on a combination of relevance and driving time, determined to be within a range between 0 (least possible desirability) and 1 (most possible desirability), $\beta$ is a tradeoff parameter between 0 (least emphasis) and 1 (most emphasis), PRS$_{path}$ is the path relevance score between 0 (least relevance) and 1 (most relevance), and TimeScore$_{path}$ is a score, based on the driving time of the path, that is normalized (e.g., based on comparison to driving times for other paths) to be between 0 (for a longest possible time of the plurality of paths) and 1 (for a shortest possible time of the plurality of paths). Alternatively, PathScore$_{path}$ may be calculated as an inverse function to be between 0 (most possible desirability) and 1 (least possible desirability), in which case PRS$_{path}$, $\beta$, and TimeScore$_{path}$ may also be represented as inverse values.

In some implementations, trip planning system 110 may utilize a multi-start local search model to calculate an optimized path, from the plurality of paths, based on the viewpoint relevance scores and the driving times associated with the plurality of paths. In this case, trip planning system 110 may randomly select sets of the viewpoints from the viewpoint data to define the plurality of paths when determining the plurality of paths as described above with respect to FIG. 1G. For each path of the plurality of paths, trip planning system 110 may select the path as an initial selection of a candidate path and may, in successive iterations until a designated stopping condition is satisfied, selectively add a particular viewpoint to the candidate path, remove another particular viewpoint from the path, or swap two viewpoints from the path to generate an alternative candidate path. For each of the candidate paths, trip planning system 110 may calculate a path score (e.g., as described above).

In some implementations, trip planning system 110 may identify a single optimized path based on a path score, associated with the single optimized path, that is the highest path score calculated. Alternatively, trip planning system 110 may identify multiple optimized paths based on path scores associated with multiple paths. For example, trip planning system 110 may identify multiple optimized paths based on a highest n (e.g., 3) path scores. Additionally, or alternatively, trip planning system 110 may calculate the path scores using different tradeoff parameters, and may identify multiple optimized paths based on determining a highest path score for each different tradeoff parameter. In this way, trip planning system 110 may identify optimized paths based on different levels of emphasis on relevance relative to emphasis on driving time.

Figure 1I:
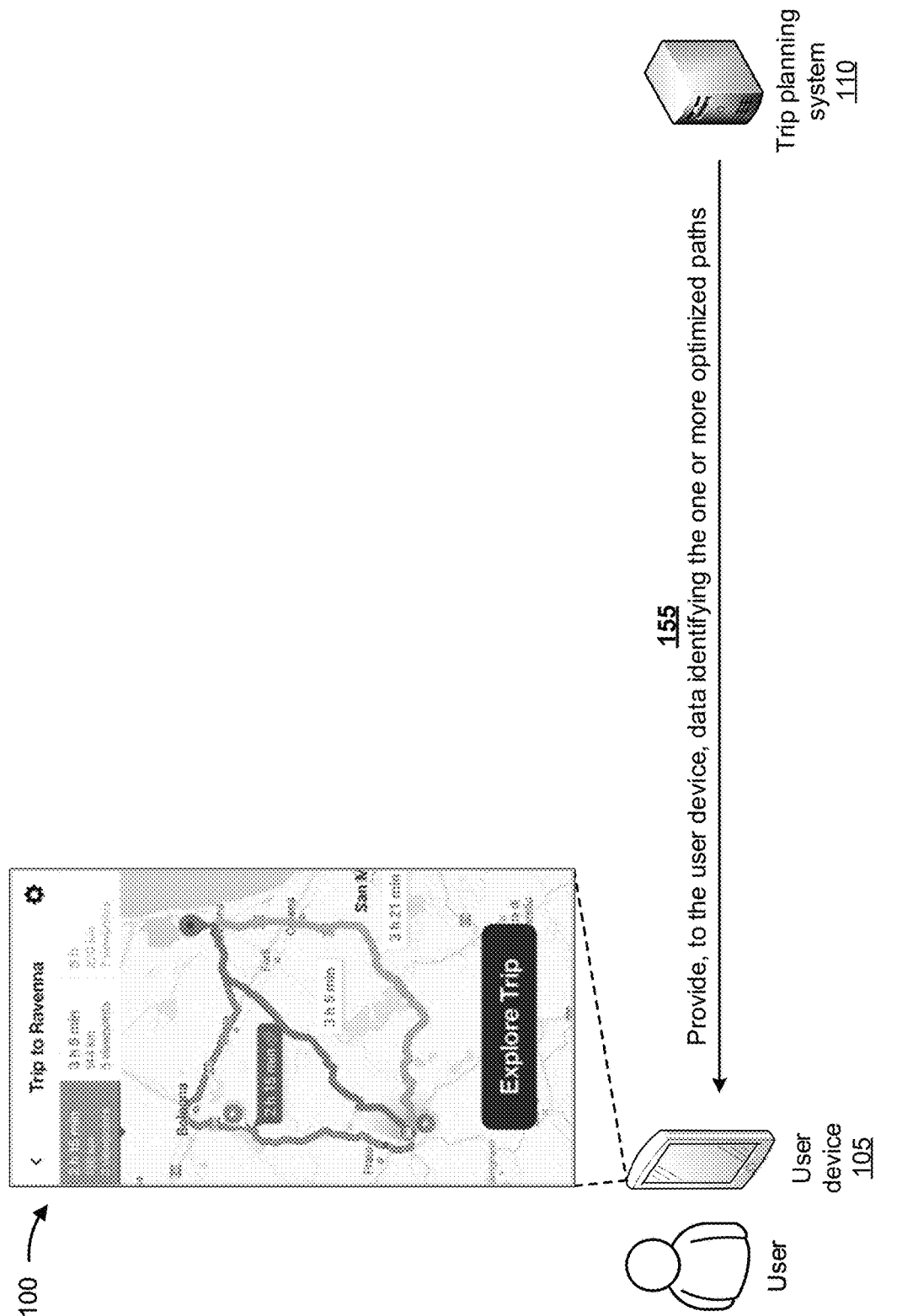

As shown in FIG. 1I, and by reference number 155, trip planning system 110 may provide, to user device 105, data identifying the one or more optimized paths. For example, trip planning system 110 may provide data that enables user device 105 to display a visual representation of the one or more optimized paths superimposed on a map that includes the starting point, viewpoints, and destination point associated with optimized paths, as shown. In some implementations, user device 105 may display the visual representation of each optimized path of multiple optimized paths with a different characteristic (e.g., a different color, thickness, and/or the like) to enable the user to distinguish among the multiple optimized paths, identify a preferred optimized path, and/or the like. In some implementations, user device 105 may display additional information associated with each of the optimized paths, such as travel time, distance, number of viewpoints, information associated with the viewpoints, and/or the like.

Figure 1J:
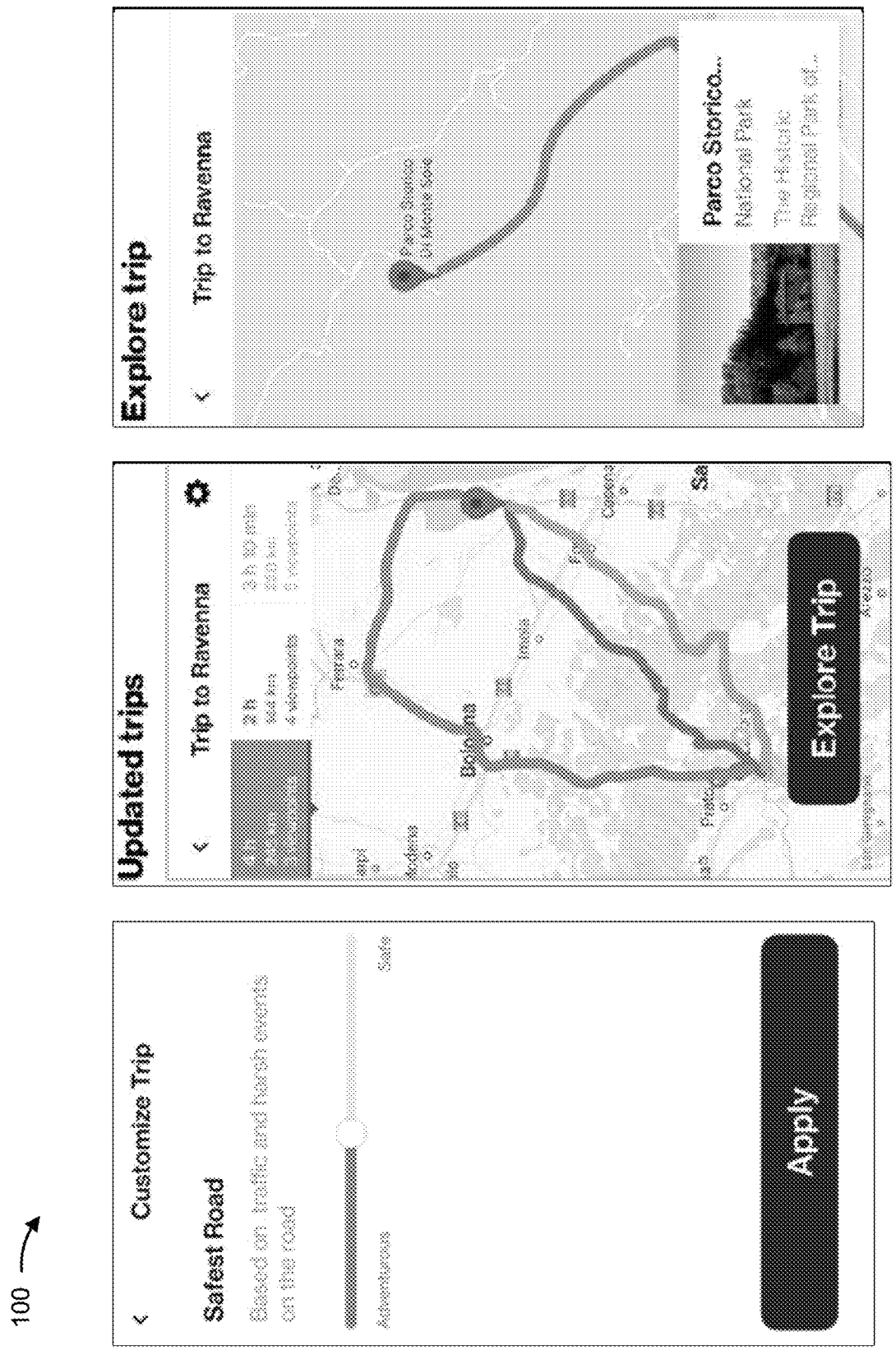

As shown in FIG. 1J, trip planning system 110 may provide, to user device 105, one or more user interfaces. The user interfaces may enable the user to customize the trip, view updated trip information, view pictures associated with particular viewpoints, view ratings and comments associated with particular viewpoints, and/or the like. In some implementations, as shown (left), trip planning system 110 may provide a user interface that enables the user to customize a trip. For example, the user interface may prompt the user to provide input (e.g., via a slider, as shown) to indicate an emphasis to be placed on a trip feature when calculating the one or more optimized paths. In some implementations, as shown (middle), trip planning system 110 may provide a user interface that displays, after updating the optimized paths to reflect the customization provided by the user, a visual representation of the updated optimized paths, along with updated travel time, distance, number of viewpoints, and/or the like. For example, trip planning system 110 may initially display the optimized paths and information shown in FIG. 1I, and may display the updated optimized paths and information shown in FIG. 1J (middle) after re-calculating the optimized paths. In some implementations, as shown (right), trip planning system 110 may provide a user interface that displays a visual representation of a portion of an optimized path that includes a particular viewpoint, and may overlay a picture of an attraction associated with the viewpoint on the visual representation.

As shown in FIG. 1K, and by reference number 160, trip planning system 110 may perform one or more actions based on the one or more optimized paths. In some implementations, the one or more actions may include trip planning system 110 providing, to user device 105, data identifying the one or more optimized paths. For example, trip planning system 110 may provide data that enables user device 105 to display a visual representation of the one or more optimized paths, as described above. In this way, trip planning system 110 may enable the user to make a well-informed selection of an optimized path, which may save time and conserve resources (e.g., computing resources, networking resources, and/or the like) that would otherwise be required to plan a trip.

In some implementations, the one or more actions may include trip planning system 110 receiving an input for the one or more optimized paths and generating one or more updated optimized paths based on the input. For example, the user may input a selection of an optimized path via user device 105 upon user device 105 displaying multiple optimized paths to the user, as shown above with respect to FIG. 1I, and trip planning system 110 may cause user device 105 to display the updated optimized paths, as shown above with respect to FIG. 1J (middle). As another example, the user may adjust the weights (e.g., by adjusting a slider bar as shown in FIG. 1J (left) above), and may calculate updated optimized paths (e.g., in a manner similar to that described above) and cause user device 105 to display the updated optimized paths. As still another example, the user may select a particular viewpoint to be eliminated from a trip, and trip planning system 110 may calculate updated optimized paths in a manner similar to that described above, and cause user device 105 to display the updated optimized paths. In this way, trip planning system 110 may enable the user to improve selection and/or generation of one or more optimized paths, which may save time and conserve resources (e.g., computing resources, networking resources, and/or the like) that would otherwise be required to alter a trip plan, that would otherwise be wasted utilizing a sub-optimal path, and/or the like.

In some implementations, the one or more actions may include trip planning system 110 providing, to the user device, navigation directions for a selected one of the one or more optimized paths. For example, trip planning system 110 may provide navigation directions that include navigation to viewpoints on the optimized paths. In some implementations, the navigation directions may include additional information specific to the viewpoints, such as times and means of accessing the viewpoints, and/or the like. In this way, trip planning system 110 enables the user to travel the optimized path and access the viewpoints in an efficient manner, which may save time and conserve resources (e.g., computing resources, networking resources, and/or the like) that would otherwise be required to invoke and input information into a separate navigation system.

In some implementations, the one or more actions may include trip planning system 110 causing an autonomous vehicle to navigate a selected one of the one or more optimized paths. In this way, trip planning system 110 may enable the user to accomplish leisure objectives (e.g., associated with the viewpoints) without interruptions or distractions based on driving responsibilities.

In some implementations, the one or more actions may include trip planning system 110 providing, to the user device, panoramic data associated with the one or more optimized paths. For example, the panoramic data may include pictures (e.g., that have been obtained from a third party provider, as described above) associated with viewpoints on an optimized path, and trip planning system 110 may cause user device 105 to display the pictures when the user selects a viewpoint (e.g., while planning a trip, while traversing the path, and/or the like), when user device 105 is within a threshold distance of the viewpoint, and/or the like. In some implementations, the panoramic data may include panoramic information associated with viewpoints on the optimized paths, such as information included in the picture data described above, information associated with viewing and photo opportunities, information associated with trails (e.g., walking trails) to use to access the viewing and photo opportunities, and/or the like. In this case, trip planning system 110 may cause user device 105 to display the information in association with the viewpoints. In this way, trip planning system 110 may enable the user to effectively plan and/or enjoy an optimal leisure experience with respect to the viewpoints.

In some implementations, the one or more actions may include trip planning system 110 providing, to the user device, road safety data associated with the one or more optimized paths. For example, the road safety data may identify specific points on the optimized path that may include road hazards or other associated dangers. In this way, trip planning system 110 may enable the user to take precautions when encountering the road hazards or dangers, which may reduce injuries, fatalities, property damage, delays, disruption of leisure activities, and/or the like.

In some implementations, trip planning system 110 may utilize machine learning to perform one or more of the above functions. For example, when determining a plurality of paths on which the calculation of optimized paths may be based, machine learning may be utilized to identify characteristics of paths that are unlikely to be optimal, so that such paths may be eliminated from the calculation. As another example, when calculating optimized paths using a multi-start local search algorithm, as described above, machine learning may be utilized to identify characteristics of paths that are more or less likely to lead to determination of optimized paths if selected as a candidate path. As still another example, trip planning system 110 may utilize machine learning to improve the identification of viewpoints, such as based on whether users select paths that include the viewpoints, ultimately travel to and/or stop at the viewpoints, and/or the like. In some implementations, trip planning system 110 may utilize machine learning to automatically perform functions that improve user experience without requiring additional inputs from users. For example, trip planning system 110 may utilize machine learning to perform automatic profiling of users, to automatically predict or determine user preferences without requiring users to answer questions or provide other information to specifically identify the user preferences, and/or the like. In some implementations, there may be thousands, millions, and/or the like, of user devices 105 that produce thousands, millions, billions, and/or the like, of data points associated with viewpoints, trip features, paths, and/or the like. In this way, trip planning system 110 may handle thousands, millions, billions, and/or the like, of data points within a period of time, and thus may provide "big data" capability.

In this way, trip planning system 110 provides an interface for customized trips based on preferences of a particular user. Trip planning system 110 may save the particular user from having to rely on sources of information external to a vehicle navigation system to identify points of interest that are of particular interest to the user. Additionally, trip planning system 110 prevents the user from having to manually determine paths that incorporate the points of interest, and/or from having to input location information for the points of interest in order for the vehicle navigation system to determine sub-routes to and/or from each of the locations. This conserves computing resources (e.g., processing resources, memory resources, communication resources, and/or the like) that would otherwise be required to research information, input additional information into the vehicle navigation system, and/or the like.

As indicated above, FIGS. 1A-1K are provided as an example. Other examples may differ from what is described with regard to FIGS. 1A-1K. The number and arrangement of devices shown in FIGS. 1A-1K are provided as an example. In practice, there may be additional devices, fewer devices, different devices, or differently arranged devices than those shown in FIGS. 1A-1K. Furthermore, two or more devices shown in FIGS. 1A-1K may be implemented within a single device, or a single device shown in FIGS. 1A-1K may be implemented as multiple, distributed devices. Additionally, or alternatively, a set of devices (e.g., one or more devices) shown in FIGS. 1A-1K may perform one or more functions described as being performed by another set of devices shown in FIGS. 1A-1K.

FIG. 2 is a diagram of an example environment 200 in which systems and/or methods described herein may be implemented. As shown in FIG. 2, environment 200 may include a trip planning system 110, which may include one or more elements of and/or may execute within a cloud computing system 202. The cloud computing system 202 may include one or more elements 203-213, as described in more detail below. As further shown in FIG. 2, environment 200 may include a network 220, and a user device 105. Devices and/or elements of environment 200 may interconnect via wired connections and/or wireless connections.

The cloud computing system 202 includes computing hardware 203, a resource management component 204, a host operating system (OS) 205, and/or one or more virtual computing systems 206. The resource management component 204 may perform virtualization (e.g., abstraction) of computing hardware 203 to create the one or more virtual computing systems 206. Using virtualization, the resource management component 204 enables a single computing device (e.g., a computer, a server, and/or the like) to operate like multiple computing devices, such as by creating multiple isolated virtual computing systems 206 from computing hardware 203 of the single computing device. In this way, computing hardware 203 can operate more efficiently, with lower power consumption, higher reliability, higher availability, higher utilization, greater flexibility, and lower cost than using separate computing devices.

Computing hardware 203 includes hardware and corresponding resources from one or more computing devices. For example, computing hardware 203 may include hardware from a single computing device (e.g., a single server) or from multiple computing devices (e.g., multiple servers), such as multiple computing devices in one or more data centers. As shown, computing hardware 203 may include one or more processors 207, one or more memories 208, one or more storage components 209, and/or one or more networking components 210. Examples of a processor, a memory, a storage component, and a networking component (e.g., a communication component) are described elsewhere herein.

The resource management component 204 includes a virtualization application (e.g., executing on hardware, such as computing hardware 203) capable of virtualizing computing hardware 203 to start, stop, and/or manage one or more virtual computing systems 206. For example, the resource management component 204 may include a hypervisor (e.g., a bare-metal or Type 1 hypervisor, a hosted or Type 2 hypervisor, and/or the like) or a virtual machine monitor, such as when the virtual computing systems 206 are virtual machines 211. Additionally, or alternatively, the resource management component 204 may include a container manager, such as when the virtual computing systems 206 are containers 212. In some implementations, the resource management component 204 executes within and/or in coordination with a host operating system 205.

A virtual computing system 206 includes a virtual environment that enables cloud-based execution of operations and/or processes described herein using computing hardware 203. As shown, a virtual computing system 206 may include a virtual machine 211, a container 212, a hybrid environment 213 that includes a virtual machine and a container, and/or the like. A virtual computing system 206 may execute one or more applications using a file system that includes binary files, software libraries, and/or other resources required to execute applications on a guest operating system (e.g., within the virtual computing system 206) or the host operating system 205.

Although the trip planning system 110 may include one or more elements 203-213 of the cloud computing system 202, may execute within the cloud computing system 202, and/or may be hosted within the cloud computing system 202, in some implementations, the trip planning system 110 may not be cloud-based (e.g., may be implemented outside of a cloud computing system) or may be partially cloud-based. For example, the trip planning system 110 may include one or more devices that are not part of the cloud computing system 202, such as device 300 of FIG. 3, which may include a standalone server or another type of computing device. The trip planning system 110 may perform one or more operations and/or processes described in more detail elsewhere herein.

Network 220 includes one or more wired and/or wireless networks. For example, network 220 may include a cellular network, a public land mobile network (PLMN), a local area network (LAN), a wide area network (WAN), a private network, the Internet, and/or the like, and/or a combination of these or other types of networks. The network 220 enables communication among the devices of environment 200.

User device 105 includes one or more devices capable of receiving, generating, storing, processing, and/or providing information, such as information described herein. For example, user device 105 may include a mobile phone (e.g., a smart phone, a radiotelephone, and/or the like), a laptop computer, a tablet computer, a desktop computer, a handheld computer, a gaming device, a wearable communication device (e.g., a smart watch, a pair of smart glasses, a heart rate monitor, a fitness tracker, smart clothing, smart jewelry, a head mounted display, and/or the like), or a similar type of device. In some implementations, user device 105 may receive information from and/or transmit information to trip planning system 201. User device 105 may include one or more hardware components, such as those described above in connection with computing hardware 203 (e.g., one or more processors 207, memories 208, storage components 209, networking components 210, and/or the like).

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
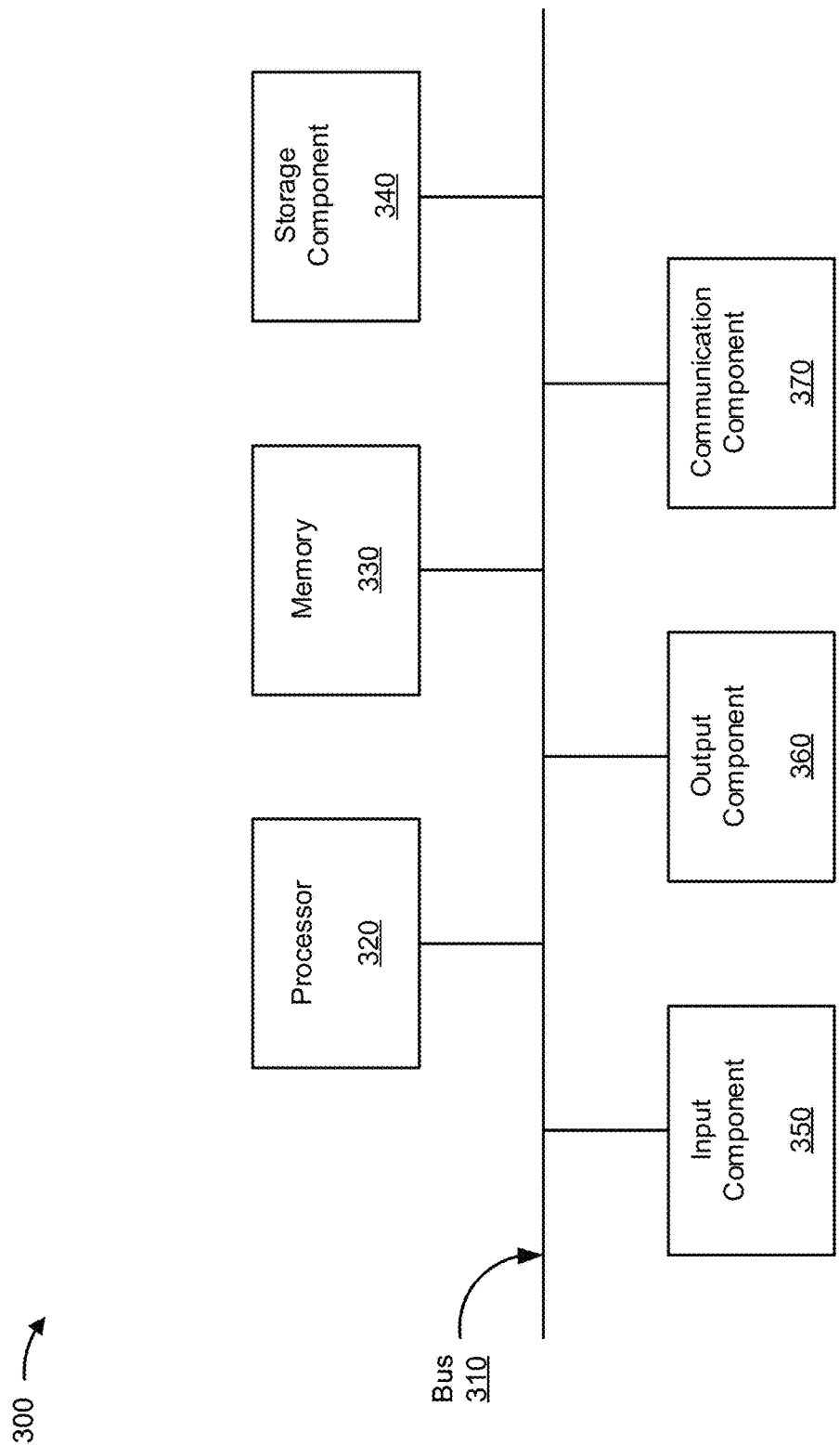
FIG. 3 is a diagram of example components of one or more devices of FIG. 2.

FIG. 3 is a diagram of example components of a device 300, which may correspond to trip planning system 110, cloud computing system 202, and/or user device 105. In some implementations, trip planning system 110, cloud computing system 202, and/or user device 105 may include one or more devices 300 and/or one or more components of device 300. As shown in FIG. 3, device 300 may include a bus 310, a processor 320, a memory 330, a storage component 340, an input component 350, an output component 360, and a communication component 370.

Bus 310 includes a component that enables wired and/or wireless communication among the components of device 300. Processor 320 includes a central processing unit, a graphics processing unit, a microprocessor, a controller, a microcontroller, a digital signal processor, a field-programmable gate array, an application-specific integrated circuit, and/or another type of processing component. Processor 320 is implemented in hardware, firmware, or a combination of hardware and software. In some implementations, processor 320 includes one or more processors capable of being programmed to perform a function. Memory 330 includes a random access memory), a read only memory, and/or another type of memory (e.g., a flash memory, a magnetic memory, and/or an optical memory).

Storage component 340 stores information and/or software related to the operation of device 300. For example, storage component 340 may include a hard disk drive, a magnetic disk drive, an optical disk drive, a solid state disk drive, a compact disc, a digital versatile disc, and/or another type of non-transitory computer-readable medium. Input component 350 enables device 300 to receive input, such as user input and/or sensed inputs. For example, input component 350 may include a touch screen, a keyboard, a keypad, a mouse, a button, a microphone, a switch, a sensor, a global positioning system component, an accelerometer, a gyroscope, an actuator, and/or the like. Output component 360 enables device 300 to provide output, such as via a display, a speaker, and/or one or more light-emitting diodes. Communication component 370 enables device 300 to communicate with other devices, such as via a wired connection and/or a wireless connection. For example, communication component 370 may include a receiver, a transmitter, a transceiver, a modem, a network interface card, an antenna, and/or the like.

Device 300 may perform one or more processes described herein. For example, a non-transitory computer-readable medium (e.g., memory 330 and/or storage component 340) may store a set of instructions (e.g., one or more instructions, code, software code, program code, and/or the like) for execution by processor 320. Processor 320 may execute the set of instructions to perform one or more processes described herein. In some implementations, execution of the set of instructions, by one or more processors 320, causes the one or more processors 320 and/or the device 300 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 3 are provided as an example. Device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
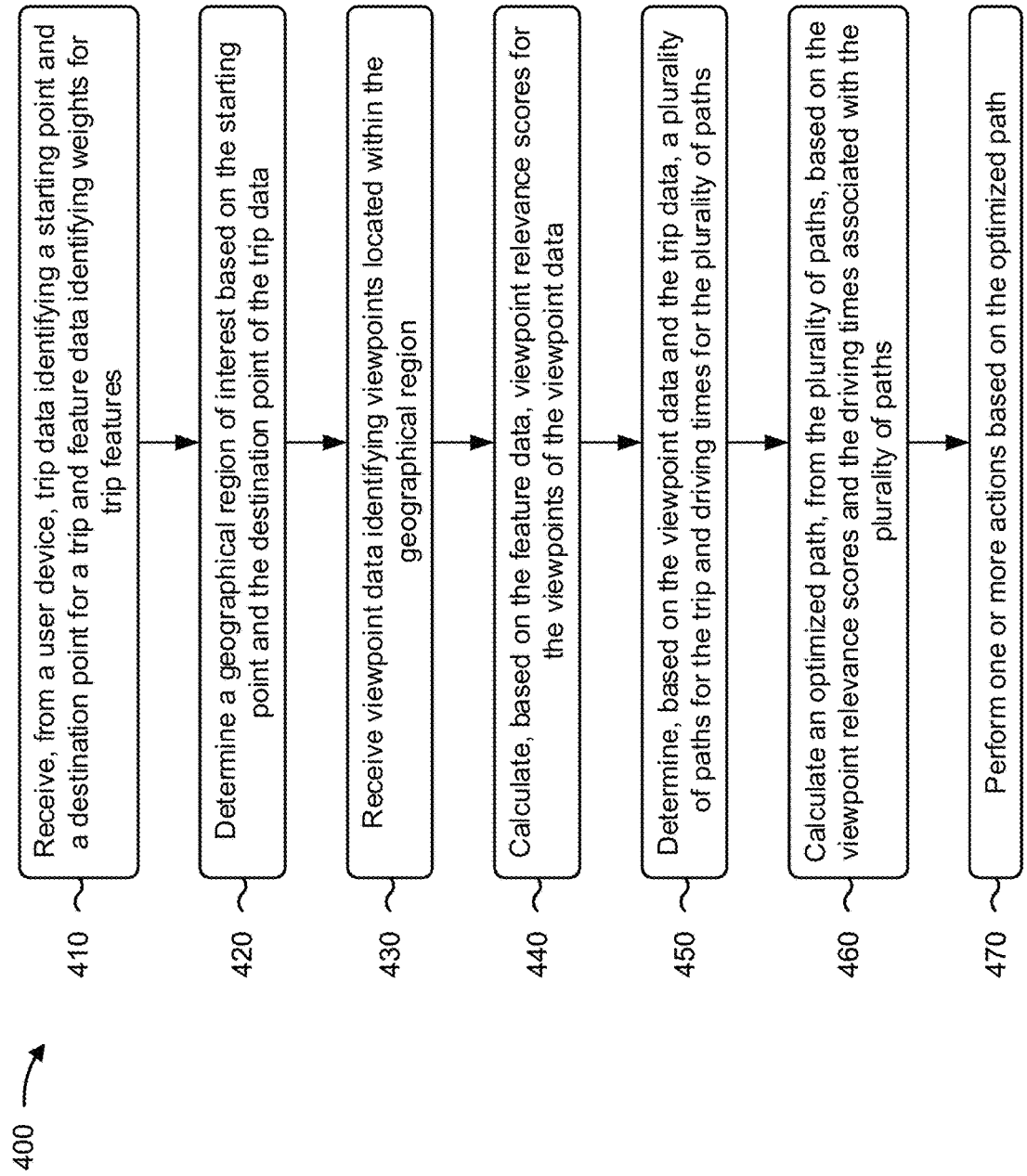
FIG. 4 is a flow chart of an example process relating to determining an optimized path for navigation based on features associated with points of interest.

FIG. 4 is a flow chart of an example process 400 associated with determining an optimized path for navigation based on features associated with points of interest. In some implementations, one or more process blocks of FIG. 4 may be performed by a trip planning system (e.g., trip planning system 110). In some implementations, one or more process blocks of FIG. 4 may be performed by another device or a group of devices separate from or including the trip planning system, such as a user device (e.g., user device 105), and/or the like. Additionally, or alternatively, one or more process blocks of FIG. 4 may be performed by one or more components of a device 300, such as processor 320, memory 330, storage component 340, input component 350, output component 360, communication component 370, and/or the like.

As shown in FIG. 4, process 400 may include receiving, from a user device, trip data identifying a starting point and a destination point for a trip and feature data identifying weights for trip features (block 410). For example, the trip planning system may receive, from a user device, trip data identifying a starting point and a destination point for a trip and feature data identifying weights for trip features, as described above. The trip features may include one or more of: a cultural point of interest, a natural point of interest, a panoramic point of interest, fuel station availability, road safety, rest point availability, hotel availability, a kid friendly point of interest, or a pet friendly point of interest. In some implementations, the trip planning system may provide, to the user device, a user interface that enables input of the trip data and the feature data, and may receive the trip data and the feature data based on the input of the trip data and the feature data via the user interface. In some implementations, the trip planning system may receive the feature data identifying weights for trip features by receiving user preferences (e.g., provided via the user interface) and determining the weights based on the user preferences.

As further shown in FIG. 4, process 400 may include determining a geographical region of interest based on the starting point and the destination point of the trip data (block 420). For example, the trip planning system may determine a geographical region of interest based on the starting point and the destination point of the trip data, as described above. Determining the geographical region may include normalizing an initial geographical region to generate the geographical region that is geographically larger than the initial geographical region. In some implementations, determining the geographical region may include normalizing the initial geographical region by modifying a feature (e.g., a side, a width, a length, a radius, an axis, and/or the like) of the initial geographical region to generate a geographical region that is geographically larger than the initial geographical region and that includes a same characteristic as the initial geographical region, wherein the characteristic includes one or more of: a starting point of the initial geographical region, a destination point of the initial geographical region, a side of the initial geographical region, a length of the initial geographical region, a width of the initial geographical region, a center of the initial geographical region, or a vertex of the initial geographical region.

As further shown in FIG. 4, process 400 may include receiving viewpoint data identifying viewpoints located within the geographical region (block 430). For example, the trip planning system may receive viewpoint data identifying viewpoints located within the geographical region, as described above. In some implementations, a particular viewpoint of the viewpoints located within the geographical region may include two viewpoints combined into the particular viewpoint.

As further shown in FIG. 4, process 400 may include calculating, based on the feature data, viewpoint relevance scores for the viewpoints of the viewpoint data (block 440). For example, the trip planning system may calculate, based on the feature data, viewpoint relevance scores for the viewpoints of the viewpoint data, as described above. Calculating the viewpoint relevance scores for the viewpoints of the viewpoint data may include calculating, for each of the viewpoints, a relevance score based on each of the weights for the trip features to generate a plurality of relevance scores for each of the viewpoints, and calculating, for each of the viewpoints, a viewpoint relevance score based on averaging the plurality of relevance scores.

As further shown in FIG. 4, process 400 may include determining, based on the viewpoint data and the trip data, a plurality of paths for the trip and driving times for the plurality of paths (block 450). For example, the trip planning system may determine, based on the viewpoint data and the trip data, a plurality of paths for the trip and driving times for the plurality of paths, as described above. Determining the plurality of paths for the trip and the driving times may include selecting an entirety of sets of the viewpoints from the viewpoint data, or selecting (e.g., randomly selecting) a subset of sets of the viewpoints as the plurality of paths for the trip, and calculating driving times associated with the sets of the viewpoints as the driving times for the plurality of paths.

As further shown in FIG. 4, process 400 may include calculating an optimized path, from the plurality of paths, based on the viewpoint relevance scores and the driving times associated with the plurality of paths (block 460). For example, the trip planning system may calculate an optimized path, from the plurality of paths, based on the viewpoint relevance scores and the driving times associated with the plurality of paths, as described above. In some implementations, calculating the optimized path from the plurality of paths may include utilizing a multi-start local search model to calculate the optimized path, from the plurality of paths, based on the viewpoint relevance scores and the driving times associated with the plurality of paths. When calculating the optimized path, the trip planning system may selectively: add a particular viewpoint to each of the plurality of paths, remove another particular viewpoint from each of the plurality of paths, or swap two viewpoints from each of the plurality of paths; may calculate a plurality of scores for the plurality of paths based on the driving times associated with the plurality of paths and based on selectively adding the particular viewpoint to each of the plurality of paths, removing the other particular viewpoint from each of the plurality of paths, or swapping the two viewpoints from each of the plurality of paths; and may identify the optimized path from the plurality of paths based on the plurality of scores.

As further shown in FIG. 4, process 400 may include performing one or more actions based on the optimized path (block 470). For example, the trip planning system may perform one or more actions based on the optimized path, as described above. The one or more actions may include providing, to the user device, data identifying the optimized path; receiving an input for the optimized path and generate an updated optimized path based on the input; or providing, to the user device, navigation directions for the optimized path. Additionally, or alternatively, the one or more actions may include causing an autonomous vehicle to navigate the optimized path; providing, to the user device, panoramic data associated with the optimized path; or providing, to the user device, road safety data associated with the optimized path. In some implementations, the one or more actions may include providing, to the user device, one or more user interfaces that include information and pictures associated with particular viewpoints located along the optimized path.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

Some implementations are described herein in connection with thresholds. As used herein, satisfying a threshold may, depending on the context, refer to a value being greater than the threshold, more than the threshold, higher than the threshold, greater than or equal to the threshold, less than the threshold, fewer than the threshold, lower than the threshold, less than or equal to the threshold, equal to the threshold, etc., depending on the context.

Certain user interfaces have been described herein and/or shown in the figures. A user interface may include a graphical user interface, a non-graphical user interface, a text-based user interface, and/or the like. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method comprising:
   receiving, by a device and from a user device, trip data identifying a starting point and a destination point for a trip and feature data identifying weights for trip features;
   determining, by the device, a geographical region based on the starting point and the destination point of the trip data,
      wherein determining the geographical region comprises normalizing an initial geographical region based on the starting point and the destination point for the trip to generate the geographical region based on altering an aspect ratio associated with the initial geographical region,
         wherein altering the aspect ratio comprises extending a shorter first side of the initial geographical region based on a longer second side of the initial geographical region;
   receiving, by the device, viewpoint data identifying viewpoints located within the geographical region;
   calculating, by the device and based on the feature data, viewpoint relevance scores for the viewpoints identified by the viewpoint data,
      wherein calculating the viewpoint relevance scores comprises:

dividing the geographical region into one or more sub-regions, associating one or more viewpoints, of the viewpoints, with a sub-region of the one or more sub-regions, calculating, using a decreasing function, a plurality of panoramic interest scores based on a panoramic interest score for each viewpoint, of the viewpoints, that is calculated based on a number of images that are associated with the respective viewpoint; and calculating the viewpoint relevance scores based on a number of harsh driving events associated with the sub-region and the plurality of panoramic interest scores;

determining, by the device and based on the viewpoint data and the trip data, a plurality of paths for the trip and driving times for the plurality of paths;

calculating, by the device, an optimized path, from the plurality of paths, based on the viewpoint relevance scores and the driving times associated with the plurality of paths; and causing, by the device, an autonomous vehicle to navigate the optimized path.

2. The method of claim 1, wherein determining the geographical region further comprises:

normalizing the initial geographical region to generate the geographical region that is geographically larger than the initial geographical region.

3. The method of claim 1, wherein calculating the viewpoint relevance scores further comprises at least one of:

calculating the plurality of panoramic interest scores further based on picture data identifying pictures associated with the viewpoints,
  wherein the viewpoint relevance scores are further based on the plurality of panoramic interest scores; or calculating road safety scores for the viewpoints based on harsh driving data identifying the harsh driving events associated with the viewpoints,
  wherein the viewpoint relevance scores are further based on the road safety scores.

4. The method of claim 1, wherein the trip features include one or more of:
  a cultural point of interest,
  a natural point of interest,
  a panoramic point of interest,
  fuel station availability,
  road safety,
  rest point availability,
  hotel availability,
  a kid friendly point of interest, or
  a pet friendly point of interest.

5. The method of claim 1, wherein calculating the viewpoint relevance scores for the viewpoints further comprises:

calculating, for each of the viewpoints, a relevance score based on each of the weights for the trip features to generate a plurality of relevance scores for each of the viewpoints; and calculating, for each of the viewpoints, a viewpoint relevance score based on averaging the plurality of relevance scores.

6. The method of claim 1, wherein calculating the optimized path from the plurality of paths comprises:

utilizing a multi-start local search model to calculate the optimized path, from the plurality of paths, based on the viewpoint relevance scores and the driving times associated with the plurality of paths.

7. The method of claim 1, wherein determining the geographical region further comprises:

normalizing the initial geographical region by modifying a feature of the initial geographical region to generate the geographical region that is geographically larger than the initial geographical region and that includes a same characteristic as the initial geographical region, wherein the characteristic includes one or more of:
  a starting point of the initial geographical region,
  a destination point of the initial geographical region,
  the shorter first side of the initial geographical region,
  the longer second side of the initial geographical region,
  a third side of the initial geographical region,
  a length of the shorter first side, the longer second side, or the third side of the initial geographical region,
  a width of the shorter first side, the longer second side, or the third side of the initial geographical region,
  a center of the initial geographical region, or
  a vertex of the initial geographical region.

8. A device, comprising:

one or more processors configured to:

receive, from a user device, trip data identifying a starting point and a destination point for a trip and feature data identifying weights for trip features;

determine a geographical region based on the starting point and the destination point of the trip data,
  wherein the one or more processors, to determine the geographical region, are configured to normalize an initial geographical region based on the starting point and the destination point for the trip to generate the geographical region based on altering an aspect ratio associated with the initial geographical region,
    wherein the one or more processors, to alter the aspect ratio, are configured to extend a shorter first side of the initial geographical region based on a longer second side of the initial geographical region;

receive viewpoint data identifying viewpoints located within the geographical region;

calculate, based on the feature data, viewpoint relevance scores for the viewpoints of identified by the viewpoint data,
  wherein the one or more processors, to calculate the viewpoint relevance scores, are configured to:
    divide the geographical region into one or more sub-regions,
    associate one or more viewpoints, of the viewpoints, with a sub-region of the one or more sub-regions,
    calculate, using a decreasing function, a plurality of panoramic interest scores based on a panoramic interest score for each viewpoint, of the viewpoints, that is calculated based on a number of images that are associated with the respective viewpoint, and
    calculate the viewpoint relevance scores based on a number of harsh driving events associated with the sub-region and the plurality of panoramic interest scores;

randomly select sets of the viewpoints from the viewpoint data as a plurality of paths for the trip;

calculate driving times associated with the plurality of paths based on the trip data;

calculate an optimized path, from the plurality of paths, based on the viewpoint relevance scores and the driving times associated with the plurality of paths; and cause an autonomous vehicle to navigate the optimized path.

9. The device of claim 8, wherein the one or more processors, when calculating the optimized path from the plurality of paths, are configured to:

selectively:
add a particular viewpoint, of the viewpoints, to each of the plurality of paths,
remove another particular viewpoint, of the viewpoints, from each of the plurality of paths, or
swap two viewpoints, of the viewpoints, from each of the plurality of paths;

calculate a plurality of scores for the plurality of paths based on the driving times associated with the plurality of paths and based on selectively adding the particular viewpoint to each of the plurality of paths, removing the other particular viewpoint from each of the plurality of paths, or swapping the two viewpoints from each of the plurality of paths; and identify the optimized path from the plurality of paths based on the plurality of scores.

10. The device of claim 8, wherein the one or more processors are further configured to one or more of:
provide, to the user device, data identifying the optimized path; or
receive an input for the optimized path and generate an updated optimized path based on the input.

11. The device of claim 8, wherein the one or more processors are further configured to one or more of:
provide, to the user device, panoramic data associated with the optimized path; or
provide, to the user device, road safety data associated with the optimized path.

12. The device of claim 8, wherein the one or more processors, when receiving the trip data identifying the starting point and the destination point for the trip and the feature data identifying the weights for the trip features, are configured to:
provide, to the user device, a user interface that enables input of the trip data and the feature data; and
receive the trip data and the feature data based on the input of the trip data and the feature data via the user interface.

13. The device of claim 8, wherein the one or more processors are further configured to:
provide, to the user device, one or more user interfaces that include information and pictures associated with particular viewpoints, of the viewpoints, located along the optimized path.

14. The device of claim 8, wherein a particular viewpoint of the viewpoints located within the geographical region includes two viewpoints combined into the particular viewpoint.

15. A non-transitory computer-readable medium storing instructions, the instructions comprising:
one or more instructions that, when executed by one or more processors, cause the one or more processors to:
receive, from a user device, trip data identifying a starting point and a destination point for a trip and feature data identifying weights for trip features;
determine a geographical region based on the starting point and the destination point of the trip data;
normalize the geographical region to generate a normalized geographical region that is geographically larger than the geographical region,
wherein the one or more instructions, that cause the one or more processors to normalize the geographical region, cause the one or more processors to normalize to generate the normalized geographical region based on altering an aspect ratio associated with the geographical region,
wherein the one or more instructions, that cause the one or more processors to alter the aspect ratio, cause the one or more processors to extend a shorter first side of the geographical region based on a longer second side of the geographical region;
receive viewpoint data identifying viewpoints located within the normalized geographical region;
calculate, based on the feature data, viewpoint relevance scores for the viewpoints identified by the viewpoint data,
wherein the one or more instructions, that cause the one or more processors to calculate the viewpoint relevance scores cause the one or more processors to:
divide the normalized geographical region into one or more sub-regions,
associate one or more viewpoints, of the viewpoints, with a sub-region of the one or more sub-regions,
calculate, using a decreasing function, a plurality of panoramic interest scores based on a panoramic interest score for each viewpoint, of the viewpoints, that is calculated based on a number of images that are associated with the respective viewpoint, and
calculate the viewpoint relevance scores based on a number of harsh driving events associated with the sub-region and the plurality of panoramic interest scores;
determine, based on the viewpoint data and the trip data, a plurality of paths for the trip and driving times for the plurality of paths;
calculate an optimized path, from the plurality of paths, based on the viewpoint relevance scores and the driving times associated with the plurality of paths; and
cause an autonomous vehicle to navigate the optimized path.

16. The non-transitory computer-readable medium of claim 15, wherein the one or more instructions, that cause the one or more processors to calculate the viewpoint relevance scores, further cause the one or more processors to:
calculate the plurality of panoramic interest scores further based on picture data identifying pictures associated with the viewpoints,
wherein the viewpoint relevance scores are further based on the plurality of panoramic interest scores; and
calculate road safety scores for the viewpoints based on harsh driving data identifying the harsh driving events associated with the viewpoints,
wherein the viewpoint relevance scores are further based on the road safety scores.

17. The non-transitory computer-readable medium of claim 15, wherein the one or more instructions, that cause the one or more processors to calculate the viewpoint relevance scores for the viewpoints, further cause the one or more processors to:

calculate, for each of the viewpoints, a relevance score based on each of the weights for the trip features to generate a plurality of relevance scores for each of the viewpoints; and calculate, for each of the viewpoints, a viewpoint relevance score based on averaging the plurality of relevance scores.

18. The non-transitory computer-readable medium of claim 15, wherein the one or more instructions, that cause the one or more processors to determine the plurality of paths for the trip and the driving times for the plurality of paths, cause the one or more processors to:

randomly select sets of the viewpoints from the viewpoint data as the plurality of paths for the trip; and calculate driving times associated with the sets of the viewpoints as the driving times for the plurality of paths.

19. The non-transitory computer-readable medium of claim 15, wherein the one or more instructions, that cause the one or more processors to calculate the optimized path from the plurality of paths, cause the one or more processors to:

selectively:
  add a particular viewpoint, of the viewpoints, to each of the plurality of paths,
  remove another particular, of the viewpoints, viewpoint from each of the plurality of paths, or
  swap two viewpoints, of the viewpoints, from each of the plurality of paths;

calculate a plurality of scores for the plurality of paths based on the driving times associated with the plurality of paths and based on selectively adding the particular viewpoint to each of the plurality of paths, removing the other particular viewpoint from each of the plurality of paths, or swapping the two viewpoints from each of the plurality of paths; and identify the optimized path from the plurality of paths based on the plurality of scores.

20. The non-transitory computer-readable medium of claim 15, wherein the one or more instructions, when executed by the one or more processors, further cause the one or more processors to one or more of:

provide, to the user device, data identifying the optimized path;

receive an input for the optimized path and generating an updated optimized path based on the input;

provide, to the user device, panoramic data associated with the optimized path; or provide, to the user device, road safety data associated with the optimized path.

* * * * *